(12) United States Patent
Milnes et al.

(10) Patent No.: US 6,744,403 B2
(45) Date of Patent: Jun. 1, 2004

(54) GPS BASED TRACKING SYSTEM

(75) Inventors: Kenneth A. Milnes, Fremont, CA (US); Stanley K. Honey, Palo Alto, CA (US); James O. McGuffin, Saratoga, CA (US); Matthew T. Lazar, Redwood City, CA (US); Roberto J. Peon, Mountain View, CA (US); James R. Gloudemans, II, San Mateo, CA (US)

(73) Assignee: Sportvision, Inc., New York, NY (US)

( * ) Notice: Subject to any disclaimer, the term of this patent is extended or adjusted under 35 U.S.C. 154(b) by 0 days.

(21) Appl. No.: 10/179,538

(22) Filed: Jun. 25, 2002

(65) Prior Publication Data

US 2003/0048218 A1 Mar. 13, 2003

Related U.S. Application Data

(63) Continuation of application No. 09/888,208, filed on Jun. 22, 2001, now abandoned.
(60) Provisional application No. 60/213,684, filed on Jun. 23, 2000, provisional application No. 60/233,360, filed on Sep. 18, 2000, and provisional application No. 60/295,310, filed on Jun. 1, 2001.

(51) Int. Cl.[7] .............................................. H04B 7/185
(52) U.S. Cl. ............................. 342/357.07; 342/357.03
(58) Field of Search ....................... 342/357.03, 357.06, 342/357.07; 701/213

(56) References Cited

U.S. PATENT DOCUMENTS

| | | | |
|---|---|---|---|
| 5,101,416 A | 3/1992 | Fenton et al. | |
| 5,129,605 A | 7/1992 | Burns et al. | |
| 5,587,715 A | 12/1996 | Lewis | |
| 5,646,844 A | 7/1997 | Gudat et al. | |
| 5,736,961 A | 4/1998 | Fenton et al. | |
| 5,781,150 A * | 7/1998 | Norris | 342/357 |
| 5,825,327 A | 10/1998 | Krasner | |
| 5,828,979 A | 10/1998 | Polivka et al. | |
| 5,831,574 A | 11/1998 | Krasner | |
| 5,912,700 A | 6/1999 | Honey et al. | |
| 5,917,553 A | 6/1999 | Honey et al. | |
| 5,977,909 A | 11/1999 | Harrison et al. | |
| 6,020,851 A | 2/2000 | Busack | |
| 6,064,336 A * | 5/2000 | Krasner | 342/357.05 |
| 6,072,504 A * | 6/2000 | Segen | 345/474 |
| 6,080,063 A | 6/2000 | Khosla | |
| 6,141,060 A | 10/2000 | Honey et al. | |
| 6,155,927 A | 12/2000 | Levasseur et al. | |
| 6,184,822 B1 | 2/2001 | Fenton et al. | |
| 6,195,090 B1 | 2/2001 | Riggins, III | |
| 6,211,821 B1 | 4/2001 | Ford | |
| 6,324,455 B1 * | 11/2001 | Jackson | 701/50 |
| 6,529,830 B1 * | 3/2003 | Eschenbach | 701/215 |
| 6,560,535 B2 * | 5/2003 | Levy et al. | 701/213 |
| 2001/0035907 A1 * | 11/2001 | Broemmelsick | 348/169 |
| 2002/0027524 A1 * | 3/2002 | Pippin | 342/357.08 |
| 2003/0103001 A1 * | 6/2003 | Huston et al. | 342/357.03 |

FOREIGN PATENT DOCUMENTS

WO  WO 00/16869  3/2000

OTHER PUBLICATIONS

T.J. Ford and J. Neumann, A Real Time Floating Ambiguity Positioning System, Proceedings of ION GPS 1994, Salt Lake City, Utah, Sep. 20, 1994.

* cited by examiner

Primary Examiner—Dao Phan
(74) Attorney, Agent, or Firm—Vierra Magen Marcus Harmon & DeNiro LLP

(57) ABSTRACT

A system uses GPS receivers and other sensors to acquire data about one or more objects at an event. The data acquired by the GPS receivers and the sensors is used to determine various statistics about the objects and/or enhance a video presentation of the objects. In one embodiment, the acquired data is used to determine three dimensional positions of the objects, determine the positions of images of the objects in a video and enhance the video accordingly. One exemplar use of the present invention is with a system for tracking automobiles at a race. The system determines statistics about the automobiles and enhances a video presentation of the race.

86 Claims, 18 Drawing Sheets

GPS BASED TRACKING SYSTEM

This application is a continuation application of U.S. patent application Ser. No. 09/888,208, entitled "GPS Based Tracking System," filed Jun. 22, 2001, now abandoned.

This application claims the benefit of U.S. Provisional Application No. 60/213,684, "Locating an Object Using GPS With Additional Data," filed on Jun. 23, 2000; U.S. Provisional Application No. 60/233,360, "System for Tracking Automobiles," filed on Sep. 18, 2000; and U.S. Provisional Application No. 60/295,310, "Track Model Constraint Enhancement For GPS Receiver," filed on Jun. 1, 2001; all three applications are incorporated herein by reference.

BACKGROUND OF THE INVENTION

1. Field of the Invention

The present invention is directed to a system that uses GPS receivers and other sensors to acquire various information about one or more objects at an event.

2. Description of the Related Art

The television presentation of sporting events needs to be improved. Because of the size and speed of some objects and the distance of the television camera from the objects of interest, some objects at a sporting event are hard to see on a television screen. To compensate for objects that are hard to see on television, broadcasters will use zoom lenses. However, the limited field of view of a zoomed camera prevents the object from being viewed in relation to the playing field and prevents the viewer from seeing other objects that are part of the sporting event. Additionally, even with zoom lenses some objects and/or features remain difficult to see on television.

In auto racing, for example, it is difficult for a television viewer to identify the cars, determine how many laps a particular car has driven, the order of the cars (e.g. first place, second place, third place, etc.) and the instantaneous velocity of a car. Additionally, because the track is so large a camera can only capture images from part of the track and viewers may miss action in other parts of the track. Other sporting events and non-sporting events also present similar challenges.

Furthermore, broadcasters may be able to sustain greater viewer interest by presenting the viewers with additional desired information about the event and provide for the use of that information in an exciting way.

Thus, there is a need for enhancing the television presentation of objects at sporting events.

SUMMARY OF THE INVENTION

The present invention, roughly described, pertains to a system that uses GPS receivers and other sensors to acquire data about one or more objects at an event. The data acquired by the GPS receivers and the sensors is used to determine various statistics about the objects and/or enhance a video presentation of the objects. In one embodiment, the acquired data is used to determine a three dimensional position of an object, determine the position of an image of the object in a video and enhance the video accordingly.

One use of the present invention is with a system for tracking automobiles at a race. The system determines statistics about the automobiles and enhances a video presentation of the race. In various embodiments, the system may include RPM sensors, brake position sensors, throttle position sensors, fuel level sensors, temperature sensors, transmission position sensors, cameras, etc. In addition to an automobile race, the present invention can be used in other environments such as with other sporting events and non-sporting events.

In any system that uses sensors, the reliability of the sensors can be a concern. In one embodiment of the present invention, one subset of one or more sensors can be used to determine data normally acquired by a second subset of one or more sensors if the second subset of one or more sensors are not providing valid data.

Another embodiment of the present invention synchronizes data among different sensors.

In one implementation of the present invention, moving objects are highlighted in a video by a highlight that changes orientation according to the attitude of the object being highlighted. A further enhancement includes providing data about the object being highlighted and visually connecting that data to the highlight or the image of the object.

Various embodiment of the present invention provide different types of data to the viewer or user. For example, in the automobile race embodiment, a user can be provided with information about a car's position in the race (e.g. first place, second place, etc), time behind the leader, lap number, lap fraction, instantaneous velocity, RPM, throttle position, brake position, drafting effect, transmission gear engaged, fuel level, a prediction of when the car's fuel will be depleted, when the car has crossed certain locations on the track, when an accident is occurring and a car's position with respect to other cars which may have already raced.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, flash memory, RAM, ROM or other suitable storage devices. In alternative embodiments, some or all of the software can be replaced by dedicated hardware including custom integrated circuits, gate arrays, FPGAs, PLDs, and special purpose computers. In one implementation, the present invention is performed by a combination of software, computers (one or more processors, one or more storage-devices, I/O, etc), sensors and communication equipment.

These and other objects and advantages of the present invention will appear more clearly from the following description in which the preferred embodiment of the invention has been set forth in conjunction with the drawings.

DETAILED DESCRIPTION

The present invention pertains to a system that acquires and uses data about one or more objects. For purposes of example and illustration only, the following discussion describes a system used in conjunction with an automobile race. However, the present invention can be used with objects other than cars and can be used in conjunction with events other than auto race events.

Figure 1:
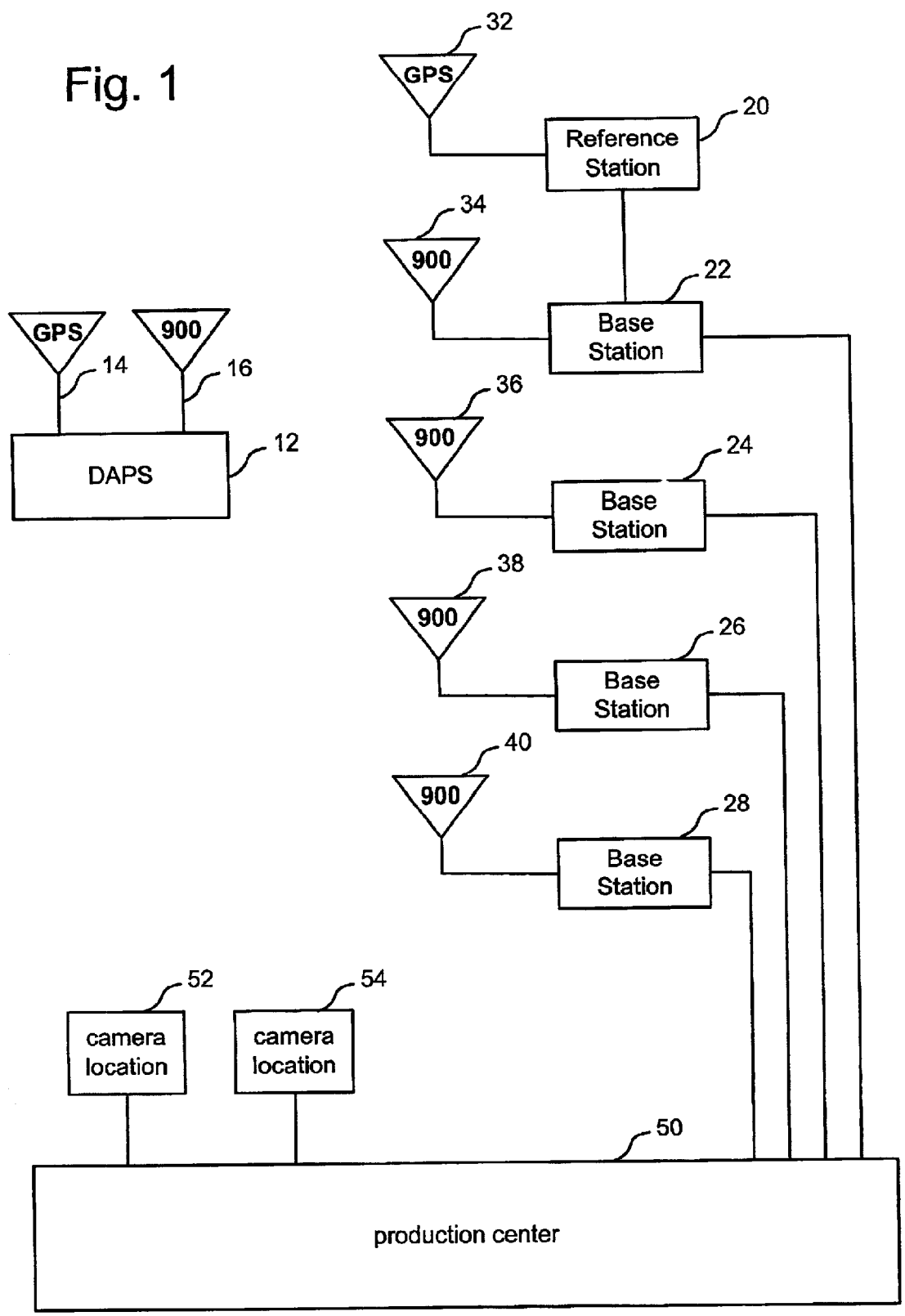
FIG. 1 is a block diagram of one embodiment of a tracking system.

FIG. 1 is a block diagram of one embodiment of the present invention. FIG. 1 shows Data Acquisition and Positioning System (DAPS) 12 with GPS antenna 14 and 900 MHz antenna 16. DAPS 12 is mounted to the object being tracked. In the embodiment pertaining to an automobile race, there will be a DAPS unit 12 mounted to each car being tracked. Thus, although FIG. 1 shows only one DAPS 12, the present invention contemplates using one or more DAPS 12 units. DAPS unit 12 includes a GPS receiver connected to GPS antenna 14. GPS antenna 14 is used to receive signals from one or more GPS satellites. 900 MHz antenna 16 is used to communicate with various base units (e.g. 22, 24, 26 and 28). In one embodiment, the system includes four base stations 22, 24, 26, 28. Base station 22 includes 900 MHz antenna 34, base station 24 includes 900 MHz antenna 36, base station 26 includes 900 MHz antenna 38 and base station 28 includes 900 MHz antenna 40. In one embodiment, there can be more than four base stations or less than four base stations. It is contemplated that base stations will be located at different parts of the racetrack (or other event). The base stations transmit data to and receive data from each of the DAPS units via the 900 MHz antennas.

Data from each of the base stations is communicated to production center 50 using DSL modems. FIG. 1 also shows camera locations 52 and 54. In various embodiments, there can be one camera location, two camera locations or more than two camera locations. Each camera location includes one or more cameras and electronics for instrumenting those cameras. Each of the camera locations is in communication with production center 50. In one embodiment, the system of FIG. 1 is used to track a three dimensional location of each of the cars during an automobile race, in real time. The system also tracks the movement of each of the cameras used to broadcast the race. Based on the information about the attitude of the cameras and the three dimensional locations of the cars, the system can highlight a live video of the race to produce a number of effects desired by the production team.

Base station 22 includes GPS reference station 20 with GPS antenna 32. This reference station is surveyed with accuracy to determine its location. Reference station 20 receives GPS information from GPS satellites and determines differential GPS error correction information. This error correction information is communicated from the GPS reference station (via base station 22) to production center 50 for eventual retransmission to each of the base stations. The base station will send the information to each of the DAPS units. In another embodiment, the system of FIG. 1 can use pseudolites to provide additional data to the GPS receivers in the DAPS units.

Figure 2:
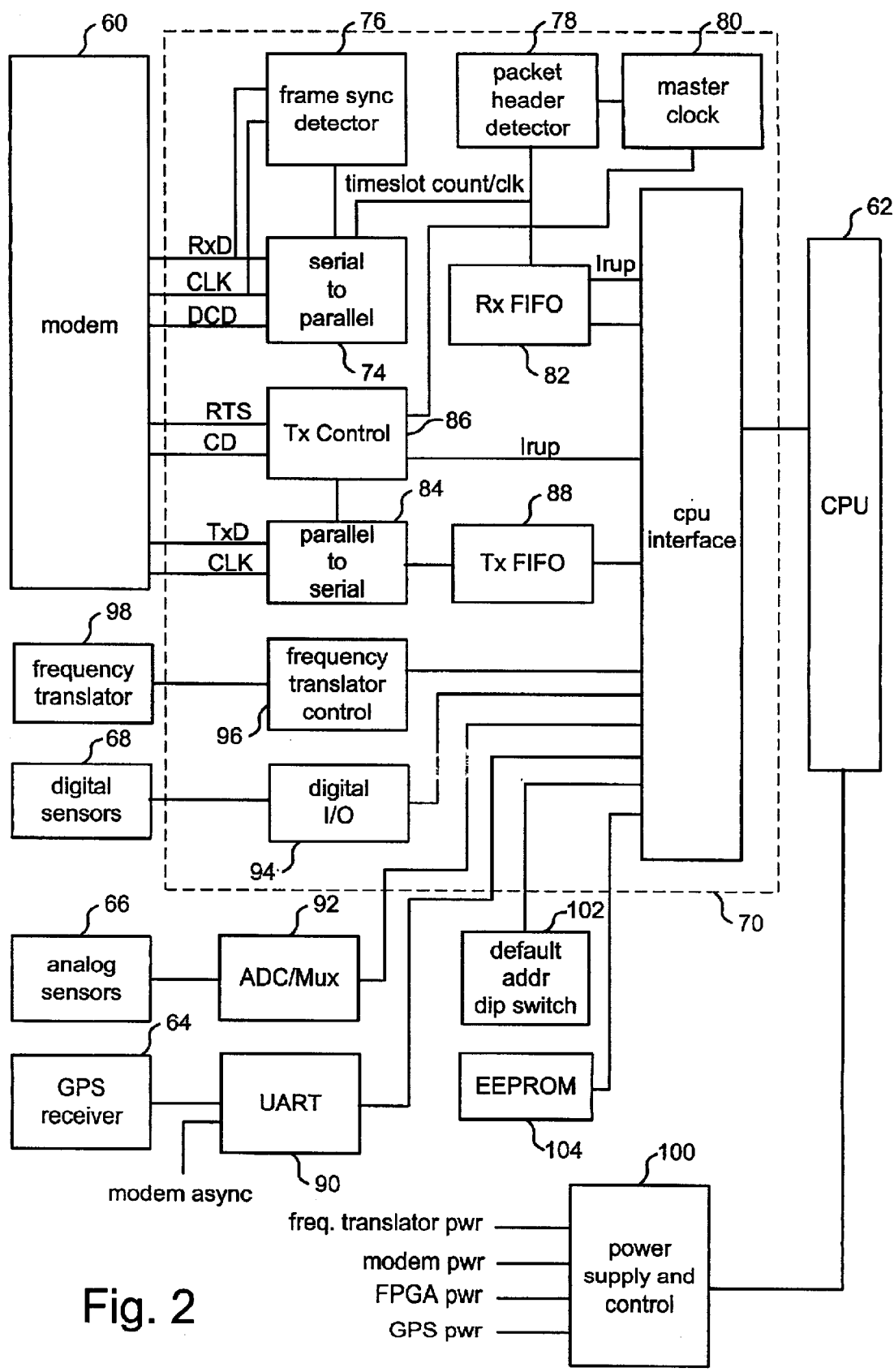
FIG. 2 is a block diagram of one embodiment of a DAPS unit.

FIG. 2 is a block diagram of DAPS unit 12. FIG. 2 shows wireless modem 60, CPU 62, GPS receiver 64, analog sensors 66, and digital sensors 68. In one embodiment, modem 60 is a Utilicom 2020 radio modem, CPU 62 is a 486 processor, and GPS receiver 64 is a NovAtel OEM4 GPS receiver. DAPS unit 12 also includes a number of sensors for sensing data about the automobile. For example, the system could include a brake sensor for determining the position of the brake pedal, an RPM sensor for determining the instantaneous RPM, throttle sensor for determining the position of the throttle, gear sensors for determining the position of the transmission, temperature sensors, sensors for determining information about the driver, etc. Some of these sensors are digital sensors 68 and some of these sensors are analog sensors 66. The remaining components of DAPS 12 are interface electronics. Some of the interface electronics are contained on a FPGA, as noted by dashed line 70.

Serial to parallel module 74 converts serial data from modem 60 to an 8-bit parallel stream. The modem does not have a byte sync signal, so it receives a signal from frame sync detector 76 once a frame sync is detected. Once the frame sync signal has been detected, the serial to parallel module 74 will clock a byte out once every 8 bits have been received. Frame sync detector 76 samples a synchronous serial data stream looking for a particular pattern of bits. Once the frame sync has been detected, it signals the condition to the serial to parallel module.

All data messages are sent with a packet header. The packet header contains the length of the packet, a time slot number, and a CRC. Packet header detector 78 reads the data stream from the serial to parallel module 74 looking for a packet header with a valid CRC. Once a valid packet header is detected, it clocks the header and the remainder of the packet into Rx FIFO 82. Data will be clocked into the Rx FIFO until the modem DCD line becomes inactive. Packet header detector 78 contains a programmable address mask. This mask is used to filter out packets not addressed to the system. If the packet header is received with bit 7 of the control character set, the condition slot number is indicated to the master clock 80. Master clock time is synchronized by a packet header where bit 7 of the control character is set. Once this signal is received, the time slot clock counters reset to the time slot indicated in the control character. The counters are adjusted to account for the length of the packet header so the counter is aligned with the start of the next packet. Master clock 80 generates a time slot counter. The time slot counter is used by Tx control 86 to determine when to send data to the transmitter. Rx FIFO 82 is used to buffer a receive data packet. The FIFO will indicate to the CPU via an interrupt when a complete data packet is loaded into the FIFO.

Parallel to serial module 84 translates parallel data from the Tx FIFO 86 to a serial stream. The serial data is clocked out by a clock provided by modem 60. Tx control 86 controls when a packet is sent to modem 60. It contains four time slot registers. The first time slot register is loaded from the default time slot dipswitch. The remaining time slot registers as well as a default time clock register may be set by CPU 62. When master clock 80 sends a time slot signal which matches one of the time slot registers, an interrupt signal is sent to the CPU interface and sets RTS active. The CPU starts to load the Tx FIFO 88 with data. The modem will turn on and set the CTS line active after approximately 2.8 ms. Once the RTS line is active, the Tx control module will enable parallel to serial module 84. Tx FIFO 88 will send a signal when it is empty. Once this condition is detected, the Tx control module will set the RTS line inactive, thus completing the packet. The Tx FIFO module buffers data sent from the CPU interface. It will normally hold one complete packet including the packet header, data payload and trailer CRC.

Communication to and from CPU 62 is via CPU interface 72. In one embodiment, CPU interface 72 is in communication with Rx FIFO 82, Tx control 86, Tx FIFO 88, frequency translator control 96, digital I/O 94, ADC 92, UART 90, default address dip switch 102 and EEPROM 104. In one embodiment, EEPROM 104 stores code for programming CPU 62. In another embodiment, the code for programming CPU 62 is stored in a flash memory.

UART 90 is used to communicate to GPS receiver 64. An 8-channel 10 bit or greater ADC is used to sample various sensors on the system. All 8 channels can be sampled at 10 Hz per channel. This module may be part of the interface board or may be supplied by the CPU module. All analog lines should be protected against high voltage transients. The analog input interface may support rheostat sensors. Sixteen general purpose digital I/O signals (see digital I/O module 94) can be available for digital sensor 68. Frequency translator control 96 is a digital output register. In one embodiment, frequency translator 98 is used to shift the frequency of the modem. In another embodiment, frequency translator 98 is not used.

Batteries are used to power the system (see power supply and control 100). Two modes are supported, standby and operate. In the standby mode, only the CPU is powered. In operate mode, all modules are powered. The CPU is able to switch the modes.

Figure 3:
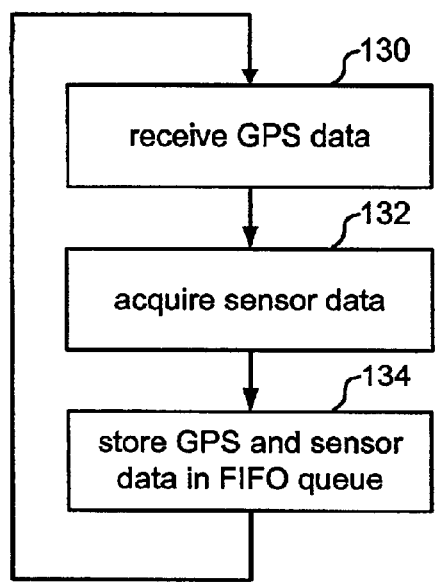
FIG. 3 is a flow chart describing the process of acquiring data on a DAPS unit.

FIG. 3 is a flowchart describing the collection of data in DAPS unit 12. In step 130, GPS data is received by CPU 62 from GPS receiver 64. In one embodiment, GPS data is received five times per second. In step 132, sensor data is acquired using analog sensors 66 and digital sensors 68. In step 134, GPS data and sensor data are stored in Tx FIFO 88. The process of FIG. 3 is continuously performed during normal operation of DAPS 12.

Figure 4:
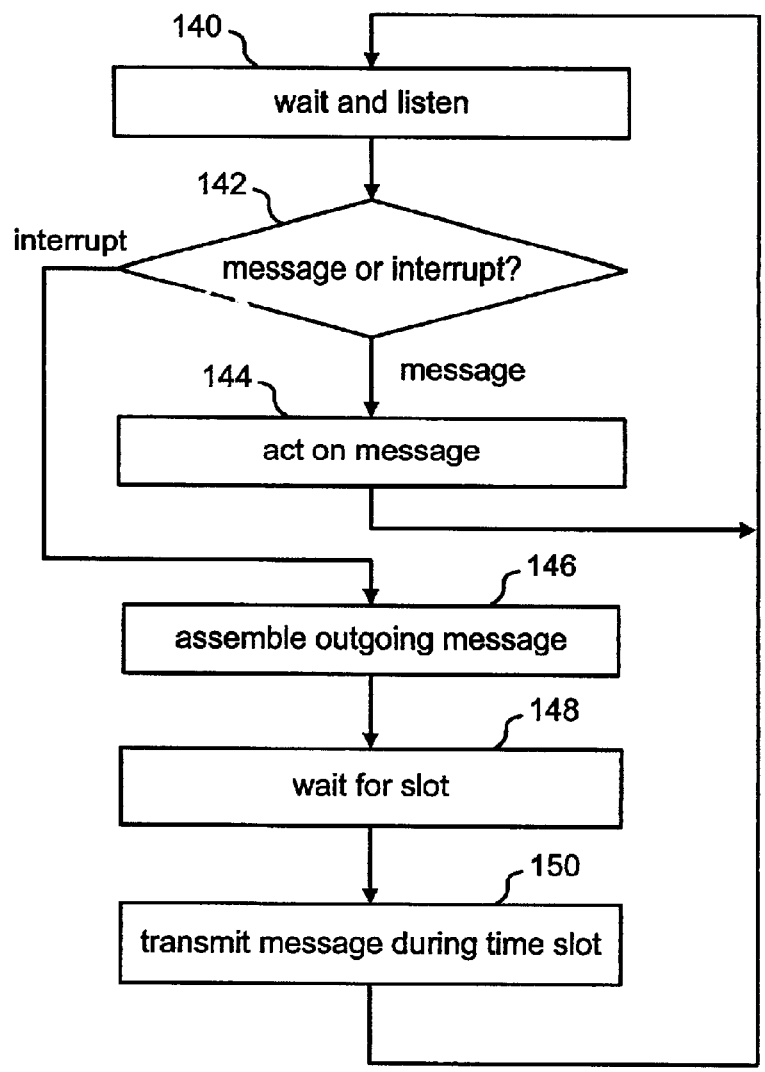
FIG. 4 is a flow chart describing a communication process for a DAPS unit.

FIG. 4 is a flowchart describing communication to and from DAPS 12. To facilitate communication between the many DAPS units and the base stations, time is divided into a repeating set of time slots. Each modem is assigned a time slot during which it may transmit. As a car moves around the track, its DAPS unit will transmit during the appropriate time slot to all base stations that can hear the signal. In step 140, DAPS 12 waits for its time slot. While waiting, it listens for incoming messages. If a message is received (step 142), then the DAPS unit acts on that message in step 144. More detail on the messages is provided below. If an interrupt is received, the method loops to step 146. The system is set up so that an interrupt is sent to CPU 62 just prior to the time slot for the particular DAPS unit. After receiving the interrupt, the system will assemble the outgoing message in step 146. These outgoing messages include one or more GPS derived positions received since the last message was sent and the data from the various sensors received since the last message was sent. In step 148, the system will wait for the exact time for the time slot. In step 150, the assembled message will be transmitted during the allotted time slot. In one embodiment, step 150 is performed two times per second.

Data is transmitted to and from the DAPS units using a communication model having four layers: a physical layer, a link layer above the physical layer, a network layer above the link layer, and a command layer above the network layer. The structures of the messages at each layer are provided below.

TABLE 1

Physical Layer

| Syntax | Bits | Format | Description |
|---|---|---|---|
| PhysicalLayerHeader( ) { | | | |
| FrameSync | 32 | uimsbf | Frame sync pattern |
| PhysicalPayload | Variable | | |
| } | | | |
| Total Length | 32 + Variable | | |

At the link layer, all data transmissions are formatted in a packet. The link layer packet header and trailer encapsulate the network layer packets Error checking is performed at the packet level. The packet header contains a CRC used by the interface hardware to correctly assemble the proper number of bytes for a complete packet. The interface hardware also uses the packet header to time synchronize the remote modems.

TABLE 2

Link Layer

| Syntax | Bits | Format | Description |
|---|---|---|---|
| LinkLayerPacket( ) { | | | |
| LinkHeader( ) { | | | |
| PacketLength | 8 | uimsbf | Length of data payload |

TABLE 2-continued

Link Layer

| Syntax | Bits | Format | Description |
|---|---|---|---|
| SystemActive | 1 | uimsbf | Set to command all remotes that are enabled to enter wake state |
| SlotNumber | 7 | uimsbf | Slot number for source modem |
| Clock Sync Bit | 1 | uimsbf | Set if this is a clock synchronization packet |
| SourceAddress | 7 | uimsbf | Address of source modem |
| HeaderCRC | 16 | uimsbf | Lower 16 bits of 32 bit CRC. CRC is computed from PacketLength to ClockSyncBit. Polynomial = $x^{32}+x^{26}+x^{23}+x^{22}+x^{16}+x^{12}+x^{11}+x^{10}+x^{8}+x^{7}+x^{5}+x^{4}+x^{2}+x^{1}+x^{0}$ The CRC calculation is seeded with 0xffffffff. The result of the CRC computation is stored as the 1's compliment of the result. |
| } | | | |
| LinkPayload | Variable | uimsbf | |
| TrailerCRC | 32 | uimsbf | 32 bit CRC of header and payload. CRC starts from first byte of LinkPayload and ends at end of LinkPayload. Polynomial = $x^{32}+x^{26}+x^{23}+x^{22}+x^{16}+x^{12}+x^{11}+x^{10}+x^{8}+x^{7}+x^{5}+x^{4}+x^{2}+x^{1}+x^{0}$ The CRC calculation is seeded with 0xffffffff. The result of the CRC computation is stored as the 1's compliment of the result. |
| } | | | |
| Total Length | 288 + Variable | | |

The system also makes use a second version of a link layer packet for communications between a base station and production center 50. Data originating from DAPS units passing through base stations will be stripped of their link layer (above) and will be shipped to the Communications Controller computer 520 (see FIG. 13) with this reduced link layer packet inside a TCP/IP packet.

TABLE 3

Link Layer II

| Syntax | Bits | Format | Description |
|---|---|---|---|
| LinkLayer2Packet( ) { | | | |
| Link2Header( ) { | | | |
|   SourceAddress | 7 | uimsbf | Address of DAPS modem |
|   Pad | 1 | uimbsf | prevents misalignment |
| } | | | |
| LinkPayload | Variable | uimsbf | |
| } | | | |
| Total Length | 8 + Variable | | |

The Network layer is used to assemble and delineate individual commands. One packet may contain a partial, 0, 1 or more commands. The Network Layer Header contains a length and sequence number. With knowledge of the fragment length and packet length, the network parser can loop through multiple packets and may re-assemble a packet which spans packets.

TABLE 4

Network Layer

| Syntax | Bits | Format | Description |
|---|---|---|---|
| Network_Layer( ) { | | | |
| NetworkHeader( ) { | | | |
|   FragmentLength | 8 | uimsbf | Length of current fragment, including header. |
|   NetworkLength | 10 | uimsbf | Length of packet, excluding header. This length represents the total length of the entire assembled network packet payload. |
|   PortNumber | 2 | uimsbf | Stays the same for all data coming from a particular socket on the originating device. |
|   SequenceNumber | 10 | uimsbf | Sequence number for all messages coming from a particular port. This increases with every message or fragment. This rolls over back to 0 only after 2^10 messages/fragments have been sent. |
|   NetworkStart | 1 | uimsbf | This bit is set if this is the first fragment of a command or a complete command. |
|   NetworkStop | 1 | uimsbf | This bit is set if this is the last fragment of a command or a complete command. |
| } | | | |
| NetworkPayload | Variable | uimsbf | Command payload. |
| } | | | |
| Total Length | 24 + Variable | | |

The Command layer is used to identify command types. With knowledge of the length of each command type, multiple commands may be placed in a packet

TABLE 5

Command Layer

| Syntax | Bits | Format | Description |
|---|---|---|---|
| Command_Layer( ) { | | | |
| CommandHeader( ) { | | | |
|   CommandNumber | 8 | uimsbf | Denotes the command type |
| } | | | |
| CommandPayload | Variable | uimsbf | |
| } | | | |
| Total Length | 1 + Variable | | |

Each modem is assigned an address. The one byte address space is broken into three ranges which describe the type of station.

TABLE 6

Address Map

| Address | Description |
| --- | --- |
| 0 | Address of the master base station. |
| 1–7 | Address range for slave base stations. |
| 8–254 | Address range for remote stations. |

Message Commands

The Command Number in the Command Packet Header describes the type of command being sent. Commands may have 0, 1 or more bytes of payload. The size of the payload is command dependent. Various commands are described below.

The Position Report, command 1, is the primary message sent from the DAPS unit to the base stations. It contains position and sensor data.

TABLE 7

Position Report

| Syntax | Bits | Format | Description |
| --- | --- | --- | --- |
| Position_Report( ) { | | | |
| LatitudeRef | 32 | simsbf | Absolute Latitude |
| LongitudeRef | 32 | simsbf | Absolute Longitude |
| AltitudeRef | 32 | simsbf | Absolute Altitude |
| Time (bits 0–31) | 32 | uimsbf | Absolute time associated with first latitude/longitude and sensor report. LSB of time represents 0.01 seconds. Time is offset from Jan. 1, 1999. |
| Time (bits 32–35) | 4 | uimsbf | |
| StandardDev | 4 | uimsbf | the range of actual standard deviation |
| NumberLatLonDeltas | 4 | uimsbf | Number of Lat/lon deltas sent in this message |
| NumberSensorReports | 4 | uimsbf | Number of sample reports sent in this message |
| for(i=0;i<NumberLatLonDeltas;i++) { | | | |
| LatitudeDelta | 16 | simsbf | Change in Latitude from previous sample |
| LongitudeDelta | 16 | simsbf | Change in Longitude from previous sample |
| AltitudeDelta | 16 | simsbf | Change in Altitude from previous sample |
| Time Delta | 8 | uimsbf | Change in time from previous sample |
| } | | | |
| for(i=0);i<NumberLatLonDeltas+1;i++) { | | | |
| StandardDev | 4 | uimsbf | range of actual standard deviation |
| } | | | |
| If(NumberLatLonDeltas == odd) { | | | |
| NULL | 4 | uimsbf | |
| } | | | |
| for(i=0;i<NumberSensorReports;i++) | | | |
| { | | | |
| RPM | 16 | simsbf | engine RPM |
| Throttle | 8 | uimsbf | throttle position |
| Brake | 8 | uimsbf | brake position |
| Other Sensor | 8 | uimsbf | data from other sensor |
| Time Delta | 8 | uimsbf | change in time from last sample |
| } | | | |
| } | | | |

The Status Report message, command 2, is sent by the DAPS units to the base stations to report on various status parameters.

TABLE 8

Status Command

| Syntax | Bits | Format | Description |
| --- | --- | --- | --- |
| Status_Report( ) { | | | |
| Time (bits 0–31) | 32 | uimsbf | Absolute time associated with first latitude/longitude and sensor report. LSB of time represents 0.01 seconds. Time is offset from Jan. 1, 1999 |
| Time (bits 32–35) | 4 | uimsbf | |
| NULL | 4 | uimsbf | |
| Temperature | 8 | simsbf | in centigrade |
| Battery Voltage | 16 | uimsbf | one LSB = .001 V |
| } | | | |

The base stations will broadcast the Enable Position Report message, command 8, to enable a set of DAPS units to send position reports (command type 1).

TABLE 9

Enable Position Report

| Syntax | Bits | Format | Description |
| --- | --- | --- | --- |
| EnablePositionReport() { | | | |
| AddressBitmap | 256 | uimsbf | Address bitmask is 256 bits (32 bytes) long. The bit position designates a particular address LSB represents address 0, MSB represents address 255. |
| } | | | |

The base stations will broadcast the Wake Mode message, command 9, to set all modems to wake mode. The SystemActive bit must be set in the Link Layer Packet Header and the modem must have the address bitmask bit set to enter wake mode.

TABLE 10

Wake Mode Message

| Syntax | Bits | Format | Description |
| --- | --- | --- | --- |
| EnableTransmissions( ) { | | | |
| AddressBitmap | 256 | uimsbf | Address bitmask is 256 bits (32 bytes) long. The bit position designates a particular address LSB represents address 0, MSB represents address 255. |
| } | | | |

The base stations will send an Assign Time slot message, command 10, to a DAPS unit to request that the DAPS unit start transmissions on the specified time slot.

TABLE 11

Assign Time slot Message

| Syntax | Bits | Format | Description |
| --- | --- | --- | --- |
| AssignTime slot( ) { | | | |
| SlotNumber | 8 | uimsbf | Slot number for transmissions |
| Address | 8 | uimsbf | Address of DAPS |
| } | | | |

Any modem may send an Echo Data Request message, command 11, to any other modem. The receiving modem will extract the source address from the packet header and send an Echo Data Response command back to the source modem with the EchoData.

TABLE 12

Echo Data Request

| Syntax | Bits | Format | Description |
| --- | --- | --- | --- |
| EchoDataRequest( ) { | | | |
| Address | 8 | uimsbf | Address of modem being requested to echo data |
| EchoData | Variable | uimsbf | Data. May be any characters |
| } | | | |

The Echo Data Response, command 12, is the response to theEcho Data Request command. Any modem will respond to an Echo Data Request command by sending the Echo Data Response message.

TABLE 13

Echo Data Response

| Syntax | Bits | Format | Description |
| --- | --- | --- | --- |
| EchoDataResponse( ) { | | | |
| Address | 8 | uimsbf | Address of modem which sent the Echo Data Request command |
| EchoData | Variable | uimsbf | Data received in the Echo Data Request message |
| } | | | |

The base station will send the Power Mode message, command 13, to a DAPS unit to request that the DAPS unit change the wake period and sleep period

TABLE 14

Power Mode Message

| Syntax | Bits | Format | Description |
| --- | --- | --- | --- |
| PowerMode( ) { | | | |
| AddressBitmask | 256 | uimsbf | 256 bits (32 bytes) long. The bit position designates a particular address LSB represents address 0, MSB represents address 255. |
| WakePeriod | 32 | uimsbf | The time between now and when the device should wake up. |
| SleepPeriod | 32 | uimsbf | An interval that indicates to wake up every SleepPeriod interval and check for power mode messages. After a short time, it will go back to sleep if not instructed otherwise. |
| } | | | |

The time slot broadcast message, command 15, will request the DAPS units to set the period of their time slots.

TABLE 15

Slot Time Message

| Syntax | Bits | Format | Description |
| --- | --- | --- | --- |
| SlotTime( ) { | | | |
| Time | 8 | uimsbf | Period in 100's of microseconds for each time slot |
| } | | | |

The "number of slots" command, command 16, will be sent by the base stations to request the DAPS units to set the total number of time slots.

TABLE 16

Number Slots

| Syntax | Bits | Format | Description |
| --- | --- | --- | --- |
| NumberSlots( ) { | | | |
| NumberSlots | 8 | uimsbf | Number of slots |
| } | | | |

In one embodiment, the base stations will send RTCA command 17 to the DAPS units to convey differential GPS information. In another embodiment, different commands can be used to convey different types of differential GPS information.

TABLE 17

RTCA

| Syntax | Bits | Format | Description |
| --- | --- | --- | --- |
| RTCA1Wrapper( ) { | | | |
| DataLength | 8 | uimsbf | length of the Data field. |
| Data | Variable | uchar[len] | Array of unsigned characters that should be passed directly from the receiving modem to the GPS receiver |
| } | | | |

The Debug command 20 is sent to convey special debugging information to the addressed device that is parsed and handled by an object separate from the standard command hierarchy.

TABLE 18

DEBUG

| Syntax | Bits | Format | Description |
|---|---|---|---|
| DEBUG( ) { | | | |
|   DataLength | 8 | uimsbf | length of the Data field. |
|   Data | Variable | uchar[len] | Array of unsigned characters that should be passed directly to the DEBUG handling object. |
| } | | | |

In one embodiment, the system will operate with 51 time slots. Two slots are reserved for transmit and receive transition, 6 time slots are reserved for base stations and 43 time slots are reserved for remote stations.

| Time Slot Timing Parameters | |
|---|---|
| Cycle Period | 0.500 sec |
| Number time slots | 51 |
| Time slot length | 0.0098 sec |
| Preamble time | 0.0031 sec |
| Data time | 0.0067 sec |
| Bit Rate | 148,640 bits/sec |
| Total Data Bits | 996 bits |
| Total Data Bytes | 124 bytes/sec |

The position of each DAPS unit is determined by using the Global Positioning System (GPS). GPS is a satellite based navigation system operated and maintained by the U.S. Department of Defense. GPS consists of a constellation of GPS satellites providing worldwide, 24 hour, three dimensional navigational services. By computing the distance to GPS satellites orbiting the earth, a GPS receiver can calculate an accurate position of itself. This process is called satellite ranging. The position being tracked is the position of the antenna of the GPS receiver.

Each GPS satellite carries an atomic clock to provide timing information for the signals transmitted by the satellites. Internal clock correction is provided for each satellite clock. Each GPS satellites transmits two spread spectrum, L-band carrier signals—an $L_1$ signal with carrier frequency $f_1=1575.42$ MHz and an $L_2$ signal with carrier frequency $f_2=1227.6$ MHz. These two frequencies are integral multiples $f_1=1540f_0$ and $f_2=1200f_0$ of a base frequency $f_0=1.023$ MHz. The L1 signal from each satellite uses binary phase shift keying (BPSK), modulated by two pseudorandom noise (PRN) codes in phase quadrature, designated as a C/A code and P code. The L2 signal from each satellite is BPSK modulated by only the P code.

A GPS receiver measures distance using the travel time of radio signals. To measure travel time of a GPS signal from the satellite to a receiver, the receiver will generate the same pseudo-random code as the satellite and compare the generated code with the received code to determine the shift between the two codes. The travel time is multiplied by the speed of light to determine the distance between the satellite and the receiver. Along with distance, a GPS receiver needs to know exactly where the satellites are in space. A calculation of a three dimensional location generally requires valid data from four satellites. GPS receivers can also provide precise time information.

The above described method of computing position requires very accurate synchronization of the satellite and receiver clocks used for the time measurements. GPS satellites use very accurate and stable atomic clocks, but it is economically infeasible to provide a comparable clock in a receiver. The problem of clock synchronization is circumvented in GPS by treating the receiver clock error as an additional unknown in the navigation equations and using measurements from an additional satellite to provide enough equations for a solution for time as well as for position. Thus, the receiver can use a less expensive clock for measuring time. Such an approach leads to the pseudorange measurement:

$$\rho = c\ (t_{rcve} - t_{xmit})$$

where $t_{rcve}$ is the time at which a specific, identifiable portion of the signal is received, $t_{xmit}$ is the time at which that same portion of the signal is transmitted, and c is the speed of light. Note that $t_{rcve}$ is measured according to the receiver clock, which may have a large time error. The variable $t_{xmit}$ is in terms of GPS satellite time.

If pseudorange measurements can be made from at least four satellites, enough information exists to solve for the unknown position (X, Y, Z) of the receiver antenna and for the receiver clock error $C_b$. The equations are set up by equating the measured pseudorange to each satellite with the corresponding unknown user-to-satellite distance plus the receiver clock error:

$$\rho_1 = \sqrt{(x_1-X)^2+(y_1+Y)^2+(z_1+Z)^2}+C_b$$

$$\rho_2 = \sqrt{(x_2-X)^2+(y_2+Y)^2+(z_2+Z)^2}+C_b$$

$$\rho_3 = \sqrt{(x_3-X)^2+(y_3+Y)^2+(z_3+Z)^2}+C_b$$

$$\rho_4 = \sqrt{(x_4-X)^2+(y_4+Y)^2+(z_4+Z)^2}+C_b$$

where $\rho_i$ denotes the measured pseudorange of the ith satellite whose position in ECEF coordinates at $t_{xmit}$ is ($x_i$, $y_i$, $z_i$). There are four equations depicted above. The unknowns in this nonlinear system of equations are the receiver position (X,Y,Z) in ECEF coordinates and the receiver clock error $C_b$. If more than four satellites are used, there will be an equation for each satellite.

There are a number of errors that are associated with GPS ranging, including errors due to the Earth's ionosphere and atmosphere, noise, multipath satellite clock, and ephemeris errors. Additionally, basic geometry itself can based on the configuration of the satellites in the sky can magnify the errors. The dilution of precision, a measure of error, is a description of the uncertainty of particular GPS data.

One enhancement to standard GPS technology includes the techniques of differential GPS, which involves a reference GPS receiver that is stationary and has its position accurately surveyed. To understand differential GPS, it is important to know that satellite signals have errors which have a high spatial and temporal correlation. So, if two receivers are fairly close to each other, the signals that reach both of them will have traveled through virtually the same slice of atmosphere, and will have virtually the same errors. With differential GPS, the stationary reference receiver is used to measure errors. The reference receiver then provides error correction information to the other receivers (e.g. roving receivers). This way, systemic errors can be reduced. The reference receiver receives the same GPS signals as the roving receivers. Instead of using timing signals to calculate its position, the reference receiver uses its known position to calculate timing. It figures out what the travel time of the GPS signals should be, and compares it to what they actually are. The difference is used to identify the error information (also called differential corrections or differential GPS data). The reference receiver then transmits the differential corrections to the roving receivers in order to correct the measurement of the roving receivers. Since the reference receiver has no way of knowing which of the many available satellites a roving receiver might be using to calculate is position, the reference receiver quickly runs through all the visible satellites and computes each of their errors. The roving receivers apply the differential corrections to the particular satellite data they are using based on information from the reference receiver. The differential correction from the reference receiver improves the pseudorange position accuracy because its application can eliminate to varying degrees many of the spatially and temporally correllated errors in the pseudorange measured at the rover receiver. A differential GPS reference receiver can also transmit its carrier measurements and pseudoranges to the roving receiver. The set of measurements and pseduoranges transmitted from the reference receiver can be used to improve the position accuracy through the use of differential carrier positioning methods.

One embodiment of the present invention uses a track model to constrain a GPS derived position. In one implementation, a track model is a set of two or more planar surfaces which approximate the (contiguous or non-contiguous) surface (or surfaces) on which the navigation takes place (or near where navigation takes place). A track model can model may different types of surfaces, and is not confined to only model a race track. In one embodiment, each planar surface is defined by three vertex points and, thus, is a triangle. Other shapes can also be used. In one implementation, the constraint provided by the track model is that while the antenna is "within" the triangle, the position of the antenna is constant in the direction normal to the planar section. Based on a fixed antenna height, a planar constraint can be defined with respect to the local planar section.

The track model positions are defined in WGS84 geographic co-ordinates but the internal reference frame for the GPS filter is in ECEF co-ordinates. This would not be a problem (the geographic co-ordinates can be simply transformed to ECEF vectors), except that the triangle search engine (described below) requires a primarily two dimensional frame. This could be satisfied if the internal position was transformed to geographic co-ordinates, but this transformation is time consuming, and it is possible that it may have to be carried out more than once per solution. So, the system generates a local (or intermediate) frame representing the model and a simple transformation that converts vectors in the ECEF frame to vectors in the local frame. The corner positions of all the triangles (in the ECEF frame) are differenced with a local "base position." These are rotated to the local frame by the rotation matrix required to rotate a vector in the ECEF fame at the base position to a vector at the base position but in the geographic frame. Local coordinates are generated in this manner for all the points in the track model. The generation is as follows:

Coordinates of model point in the local frame:

$$P_l = R_e^{1*} (P_{ECEF} - P_{BaseECEF})$$

where $P_{BaseECEF}$ is the base position vector in the ECEF frame, $P_{ECEF}$ is the track model position in the ECEF frame, and $R_e^1$ is the rotation matrix used to transform a vector in the ECEF frame to the geographic frame at the base position.

If a triangle search is required (see below), the current GPS position is transformed to the local frame via the same method and the search progresses as usual in that frame. Internally in the GPS receiver, the coordinates for all the points in the track model are maintained both in the ECEF frame and in the local frame. The constraint position is generated from the ECEF coordinates, and the search algorithm is applied using the coordinates in the local frame. The search algorithm described later finds an appropriate triangle. The previously generated constraint position is taken from it and used as a seed position in the least squares pseduorange filter and as a position update in the Kalman filter used to generate refined carrier based positons. In the pseudo range case, the 6 weight matrix elements for that triangle constraint are expanded to generate a weight matrix $P_x$ for the least squares filter. Alternatively, in the combined pseudo range/carrier observation case, the 6 elements representing the upper triangular portion of the covariance matrix for that triangle constraint are expanded to generate a covariance matrix $_{Cx}$ for the Kalman filter.

Figure 5:
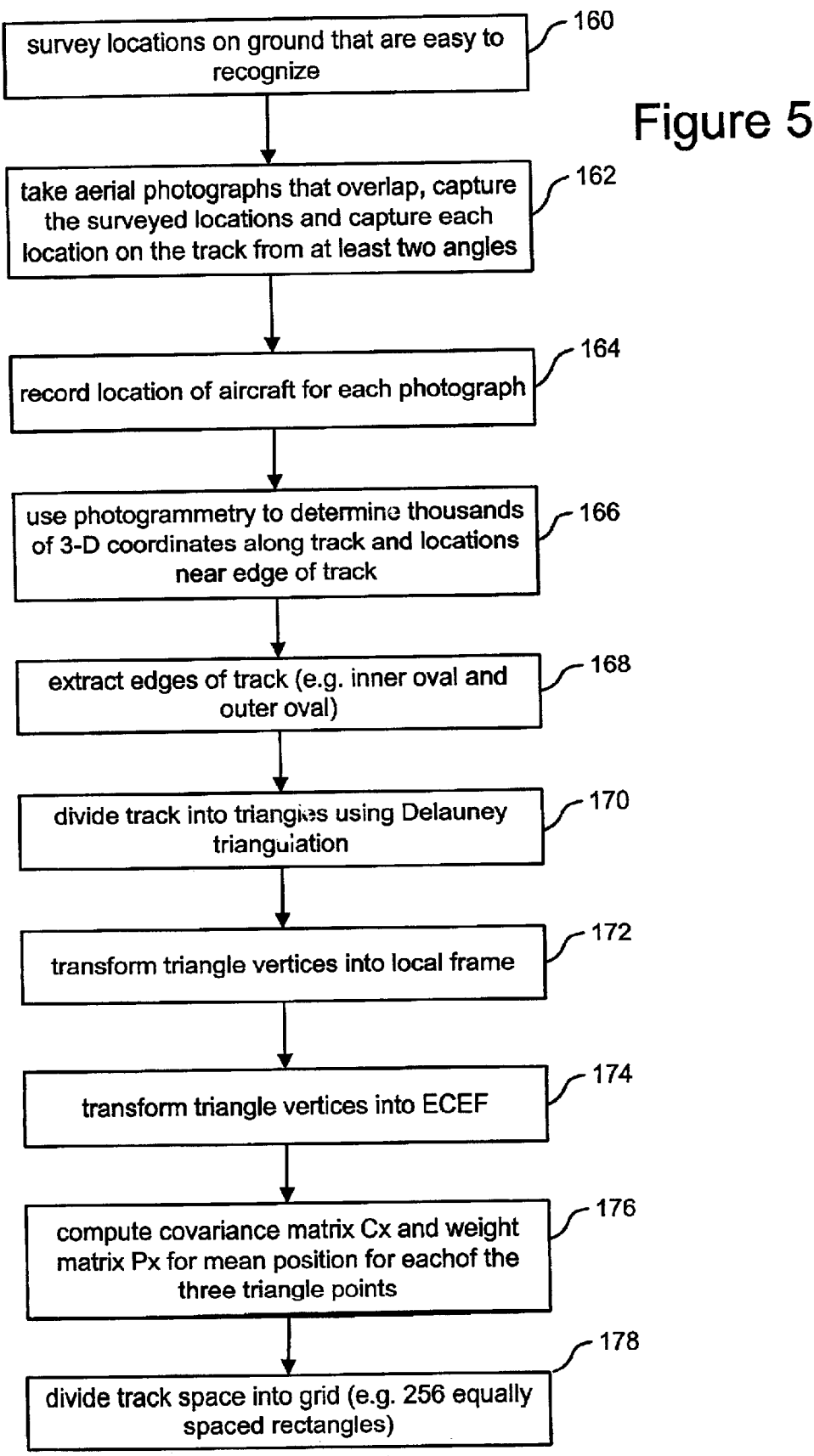
FIG. 5 is a flow chart describing a process for creating a track model.

FIG. 5 is a flow chart describing the process for creating a track model. In step 160, various locations on the ground at or near the race track (or other surface) that are easy to recognize are accurately surveyed. In step 162, aerial photographs are taken of the race track (or other surface). The photographs are taken from an aircraft approximately 300 meters above the track surface and are overlapping so that they capture each location on the race track and each of the surveyed location from at least two angles. The location of the aircraft is recorded for each photograph (step 164). In step 166, photogrammetry is used to determine thousands of three dimensional coordinates along the track surface and location near the edge of the track. In step 168, the edges of the track surface are extracted. In some cases, the edges of the track surface include an inner oval (or other shape) and an outer oval (or other shape). In step 170, the track surface is divided into a set of two or more sub-surfaces. In one embodiment, the sub-surfaces are polygons (or other shapes). In one implementation, step 170 includes dividing the track into triangles using Delauney triangulation. In step 172, the triangles are transformed from the geographic frame to the local frame as discussed above. In step 174, the triangles are transformed to the ECEF frame. In step 176, the system computes the covariance matrix $C_x$ and the weight matrix $P_x$ (described below) with respect to the ECEF frame for each triangle. In step 178, the entire track model space is divided into a grid. In one embodiment, the grid includes 256 equally sized rectangles in the local frame.

In one implementation, the process of FIG. 5 is performed prior to a race (or other event). After the process of FIG. 5 is completed, the track model is available to the GPS receiver for use in determining the position of the GPS antenna.

Figure 6:
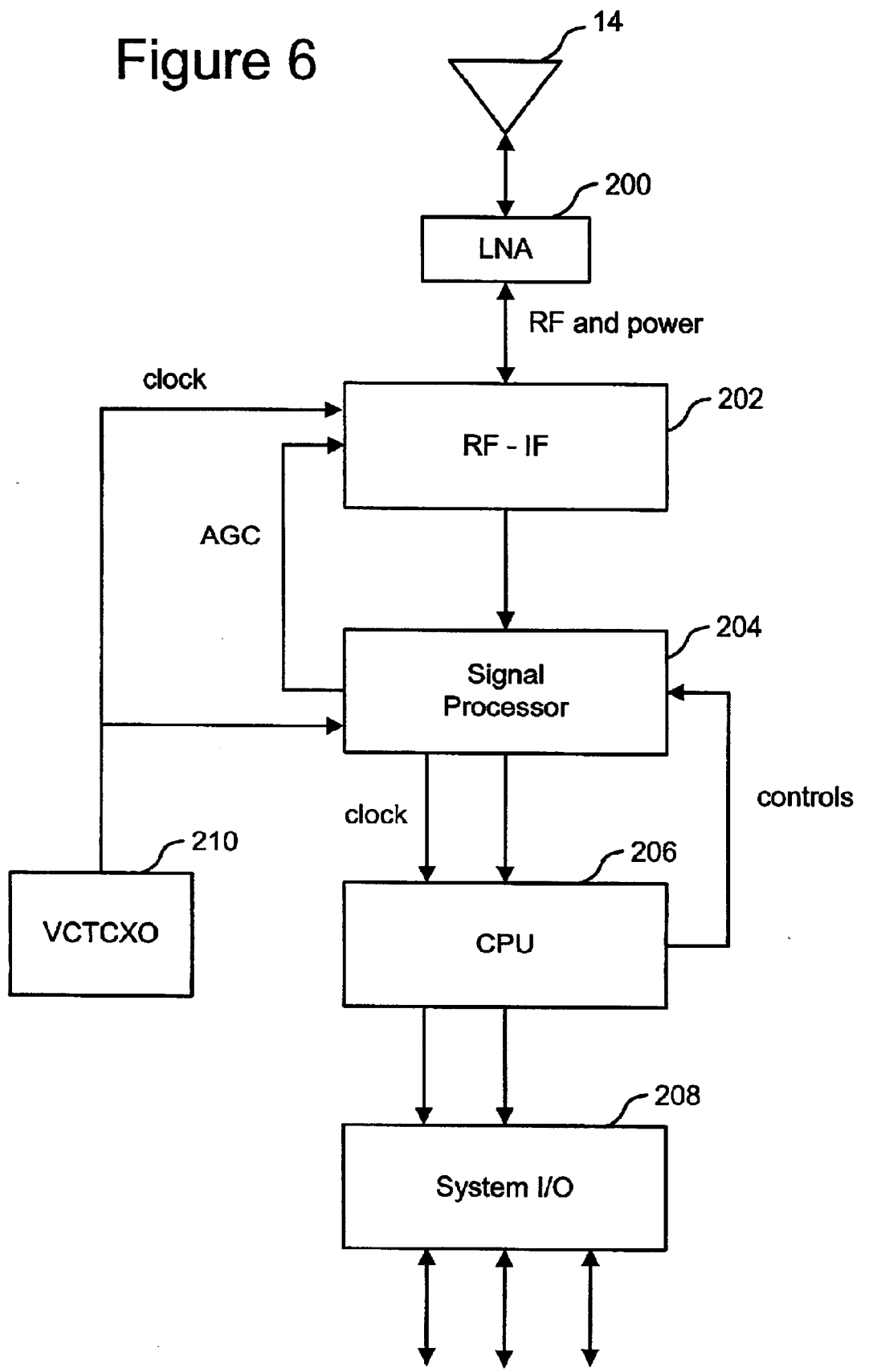
FIG. 6 is a block diagram of a GPS receiver.

FIG. 6 is a block diagram of the major components of one embodiment of a GPS receiver that can be used with the current invention. Other receiver configurations and designs can also be used with the current invention. FIG. 6 shows antenna 14 connected to low-noise amplifier ("LNA") 200. LNA 200 is connected to RF to IF translation unit 202, which translates the incoming RF signal to an IF signal usable by the digital section of the receiver. RF to IF translation unit 202 supplies power to LNA 200 and receives a clock signal from on-board 20 MHz voltage controlled, temperature compensated crystal oscillator (VCTCXO) 210. The digital section of the receiver receives a down-converted, amplified GPS signal which it digitizes and processes to obtain a GPS solution (position, velocity and time). The GPS signal is sent from RF to IF translation unit 202 to signal processor 204. In one embodiment, the analog to digital converter is part of signal processor 204 and receives the signal from RF to IF translation unit 202. In another embodiment, the analog to digital converter is a separate component between RF to IF translation unit 202 and signal processor 204. Signal processor 204 receives a clock signal from VCTCXO 170, provides a clock signal to CPU 206 and sends information back to RF to IF translation unit 202 (see signal AGC). Signal processor 204 receives control signals from CPU 206 and provides data to CPU 206. Information is transmitted between CPU 206 and system I/O 208 for communication with components outside of the receiver. Differential GPS data is provided to the GPS receiver via system I/O 208. Not explicitly depicted in FIG. 2 are various supporting circuitry, memory (which may be part of the CPU), control and configuration logic, and serial peripheral devices, each of which can be separate components or part of one of the depicted components (including the processor). One example of a GPS receiver is the OEM4 from Novatel, Inc.

Figure 7:
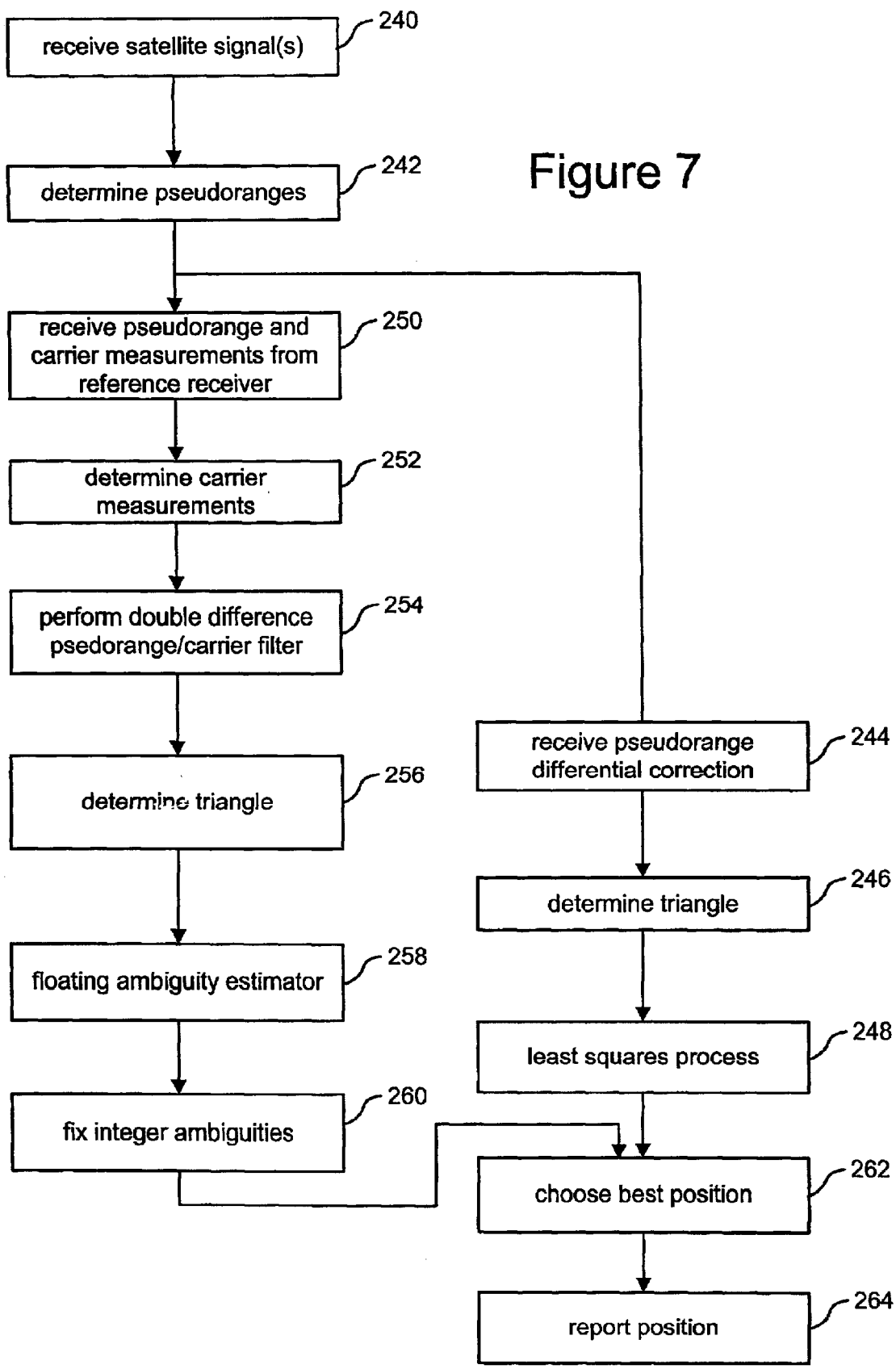
FIG. 7 is a flow chart describing a process performed by the GPS receiver.

FIG. 7 is a flow chart describing one embodiment of the operation of a GPS receiver according to the present invention. In step 240, one or more signals from a set of satellites are received. In step 242, psuedoranges are determined. FIG. 7 shows that after step 242, two independent processes are performed. The first process includes steps 244–248. The second process includes steps 250–260.

In step 244, differential corrections are received from the differential reference receiver. In step 246, the system accesses the track model and determines the appropriate planar surface to use for constraining the GPS determined position. In one embodiment, the track model is comprised of a set of triangles and step 246 includes determining which triangle represents the portion of the track that the receiver is currently on (or within). In one implementation, there are four relevant frames: (1) ECEF, (2) local frame, (3) geographic frame (e.g. WGS84), and (4) the planar surface (or triangle) frame. One embodiment of the track model is originally created and broken into triangles in the geographic frame. All of the vertices of the triangles are converted to the local frame and the ECEF frame prior to the race (or other event). The position supplied to the search mechanism of step 246 is converted from ECEF to the local plane in-real-time and the search mechanism operates in the local frame. The result of the search mechanism is an identification of a triangle in the local plane, which is used to access the three vertices of the triangle already converted to the ECEF frame. In step 248, the GPS receiver performs a least squares process using the triangle identified in step 246.

In step 250, the system receives pseudoranges and carrier measurements from the reference receiver. In step 252, the system determines carrier measurements. In step 254, the system performs the double difference/carrier filter. In step 256, the system determines the appropriate triangle. In step 258 a floating ambiguity estimator is used, which provides a position covariance. In step 260, ambiguities are fixed using an integer ambiguity estimator. More detail about steps 252–260 are provided below.

In step 262, the system chooses the best position to report, based on the least squares process, the floating ambiguity estimator and the integer ambiguity estimator. In step 264, the position determined by the GPS receiver is reported. In one embodiment, reporting includes transmitting an electronic message to a client device so that the position, velocity and time can be stored, used, displayed, etc. In a different alternative, the receiver will initially report the position based on step 248, and after a predesignated amount of time or calculations the receiver will report the position based on steps 258 and 260.

Figure 8:
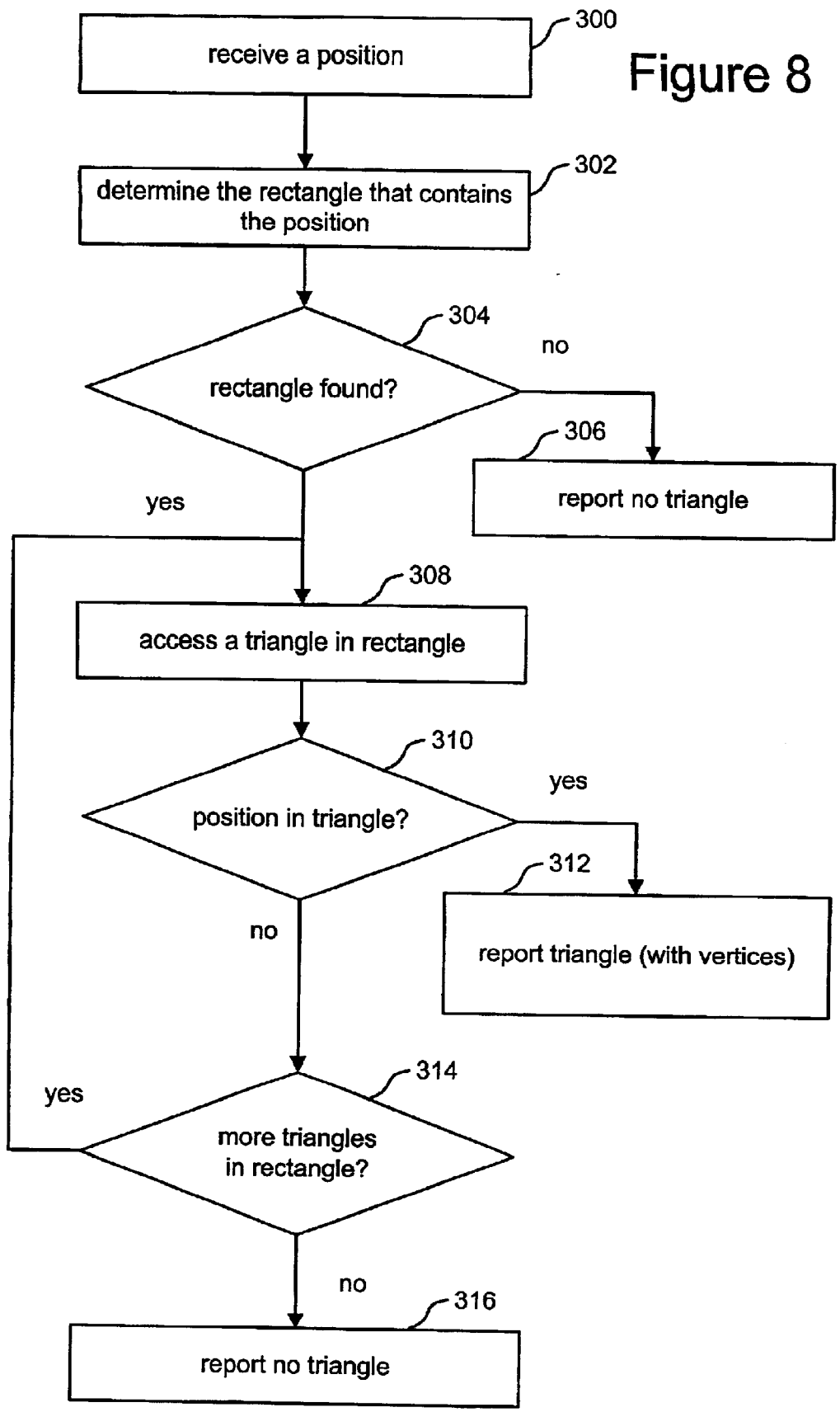
FIG. 8 is a flow chart describing a process for identifying an appropriate triangle from the track model.

FIG. 8 is a flow chart that describes the process of determining which triangle of the track model the receiver is currently navigating on. In step 300, the process receives a position of the receiver. In one embodiment, the position received in step 300 is the position generated by the GPS receiver at the last epoch. In another embodiment, the position received in step 300 is a current position determined by the GPS receiver without using the track model constraint.

In one implementation, the process of FIG. 8 is performed twice: once for the least squares-process and once for the Kalman filter. When performing the process of FIG. 8 for the least squares process, step 300 includes receiving the position generated by the GPS receiver at the last epoch for the least squares process. When performing the process of FIG. 8 for the Kalman filter, step 300 includes receiving the current position determined by the GPS receiver without using the track model constraint for the Kalman filter.

In step 302, the receiver determines the rectangle in the track model space (see step 176) that contains the position received in the previous step. If no such rectangle is found (step 304), than the process reports in step 306 that the position is not within a triangle and the track model cannot be used to constrain the GPS position. If a rectangle is found (step 304), then the GPS receiver accesses one of the triangles within the rectangle in step 308 and determines whether the position (from step 300) is in (or on) the triangle in step 310. A triangle is in a rectangle (for purposes of step of 308) if any part of the triangle is within the rectangle. Thus, a triangle can be in many rectangles and a rectangle may contain many triangles. Step 310 can be performed by comparing the coordinates of the vertices of the triangle to the position from step 300. If the position is within the triangle (step 310), then the process of FIG. 8 identifies the triangle in step 312. If the position was not in the triangle (step 310), then the process determines whether there are more triangles in the rectangle that need to be considered (step 314). If there are more triangles to consider, then the method loops back to step 308. If there are no more triangles to consider, then the process reports in step 316 that the position is not within a triangle and the track model cannot be used to constrain the GPS position.

Step 248 includes using a least squares process with the identified triangle. The least squares process is described below. The modification required to constrain to a planar surface follows.

The least squares filter generates corrections to the system's ECEF position and clock according to the equation:

$$\delta X = (A^T P A)^{-1} A^T P \omega$$

where $\delta X$ = correction vector to position vector and clock $[X,Y,Z,Clk]^T$ A = design matrix (n×4) based on satellite to receiver geometry In detail $A = [A_1, A_2, A_3 \ldots A_n]^T$ And $A_i = [\partial R^i/\partial X, \partial R^i/\partial Y, \partial R^i/\partial Z, 1]$ With $R^i = ((X^i-X)^2 + (Y^i-Y)^2 + (Z^i-Z)^2)^{1/2}$ X,Y,Z = ECEF user position $X^i, Y^i, Z^i$ = ECEF satellite position P = Pseudo range observation weight matrix (n×n) which is diagonal, with the diagonal entries being the reciprocal of the variance entries of the pseudo ranges; and $\omega$ = The vector of misclosures between the theoretical observations based on the current satellite set and the last set of positions estimated, and the actual observations (pseudo ranges). The values of X, Y, Z at the first iteration are the constrain position, $X_{cp}$. At later iterations, the position remains some-what close to $X_{cp}$, with the vertical component of the position being especially close to the vertical component of $X_{cp}$
So:

$$\omega = R_{obs} - R^i - Clk$$
$$= R_{obs} - ((X^i - X)^2 + (Y^i - Y)^2 + (Z^i - Z)^2)^{1/2} - Clk$$

$R_{obs}$ is based on the measured pseudoranges. At every observation time, the process is repeated until the length of the vector of corrections ($\delta X$) to the position/clock parameter vector is small enough. In some cases, this may be accomplished after two iterations. At each epoch, the previous position and clock estimate is used to start the process, but any covariance information associated with that estimate is ignored. This means that at every epoch, at least 4 satellites are needed to estimate the 4 elements on the position/clock vector. If information related to the position/clock parameters were available, then this could be included in a modified least squares process according to the following:

$$\delta X = (A^T P A + P_x)^{-1} A^T P \omega$$

where $P_x$=Parameter weight matrix (4×4) based on knowledge of the parameters includes in the estimation process.

If certain elements of the parameter vector are well known, then this knowledge can be incorporated in the system by making the appropriate diagonal elements of the parameter weight $P_x$ large. If, for example, the clock estimate has a standard deviation of ½ m, then the $P_x$ entry $P_{4,4}$ would be 4, and one less satellite would be required in the estimation process to generate a 4 parameter solution.

There are more complications if the knowledge of height is to be represented by this system. Height is in the geographic reference frame; therefore, the covariance information for height must be transformed from the geographic frame to the ECEF frame before it can be used by the system in the estimation process. The $P_x$ matrix is:

$$P_x = C_x^{-1} = (J^T C_g J)^{-1}$$

where:

$C_g$=the covariance matrix of the position/clock in the geographic frame;

J=the matrix of derivatives of the transformation of position/clock from the geographic to the ECEF frame; and $C_x$=the covariance matrix of position/clock in the ECEF frame.

In the case of the track model application, J is not the rotation matrix used to transform a vector from the geographic to the ECEF frame, but instead a rotation matrix used to transform a vector from the planar section frame to the ECEF frame. The J matrix is used to set up the weight and covariance matrices of the constraint positions, and these matrices are pre-computed prior to the race. The J matrices are not required except for this, so in one embodiment they aren't retained for or recomputed during the race. The J matrix can be generated by representing three basis vectors, describing the planar section frame and a normal to it, in the ECEF frame. The positions of the vertices of each triangle are transformed from the geographic to the ECEF frame. The differences of these vectors are parallel to the planar section, and the cross product of two of these difference vectors provides a normal vector to the planar section. The cross product of the normal vector with either of the vector differences generates a vector parallel to the planar section and orthogonal to the other two vectors used in the cross product. Finally, normalizing these three vectors provides a set of orthonormal basis vectors representing the planar section frame in ECEF co-ordinates. So this set of vectors can be concatenated to generate J, the 3 by 3 rotation matrix used to rotate a vector from the planar section frame to the ECEF frame. Symbolically:

$$J = [B_1 | B_2 | B_3]$$

where $B_1, B_2, B_3$ are the basis vectors whose construction is defined in the previous paragraph.

The constraint position is given by the average of the three corner positions in the ECEF frame plus the constraint position relative to the planar section, transformed to the ECEF frame. Symbolically, this is:

Constraint position: $X_{cp} = ((X_1 + X_2 + X_3)/3.0) + J^*[0, 0, h_a]^T$ where $X_1$, $X_2$, $X_3$ are the ECEF positions of the planar section corners, and $h_a$ is the antenna height with respect to a level planar section.

Looking back at FIG. 7, the process of steps 250–260 will be explained in more detail. The system uses a Kalman filter with the track model. This process is also known as the RT20 process. The RT20 process generates estimates of the relative position between a reference GPS receiver and a roving GPS receiver as well as estimates of floating ambiguities related to the double difference carrier observations for those two receivers. In one embodiment, the RT20 process provides a best available solution when real-time kinematic (RTK) data is not available as well as providing an initial search space for the RTK carrier based process.

Carrier positioning is a process in which a relative position between two ground sites (a base station and a roving receiver) is computed based upon observed fractional phase differences and known whole cycle differences between the two receivers. The fractional and whole cycle differences together produce a synthetic observation which is equal (when converted to meters) to the geometrical difference in distance between the two receivers and the satellite they are both observing. Knowledge of the whole cycle portion of the synthetic observation cannot normally be determined directly from the observations, but must be determined indirectly from many observations over time during what is known as a whole cycle resolution process. The whole cycle difference is also known as a carrier ambiguity, and the resolution process is known as an ambiguity resolution process.

In one process, in order to resolve fixed integer ambiguities, an initial guess of the position difference is made and a series of sets of ambiguity candidates is selected such that each set will generate a position difference that is close to the one chosen in the initial guess. Each set is used to compute a position difference and an associated set of residuals. For each set, these residuals are accumulated and the accumulation compared to a theoretical accumulation and also to other accumulations in the series of candidate sets. If the correct set of ambiguities is in the series, then eventually its residual accumulation will be close to the theoretical accumulation and also smaller than any of the residual accumulations for the other sets. At this time the correct ambiguity set is known and can be used to generate relative positions with carrier type accuracy.

To summarize, there are two things that are done to resolve ambiguities:

(1): Guess at an initial position, and an associated search space whose size is based on the precision of the initial position estimate; and (2): Use the guess and its precision to define a series of candidate sets of ambiguities and then accumulate computed residuals over time and eliminate sets whose residual accumulation exceeds some kind of threshold.

Typically a Kalman filter with both position and ambiguity states is used to define an initial guess for the search space. It is run in real-time as carrier and pseudo range observations are provided to it and some kind of executive routine monitors its position covariance to see when the search space can be defined and search can commence. By including position constraints with the GPS observation set, the precision of the initial position estimate used to define the search space can be reduced sooner and more, and this should significantly speed up the resolution process.

The Kalman filter used to estimate position and floating ambiguity states can be described as follows:

State: X=[x,y,z,N1,N2, . . . Nk]

State Initial Covariance: P=[big diagonal elements, 0 off diagonal elements]

The design matrix H defines the linear relationship between the double difference observation (satellites r,j and the two receivers) and the state elements. For satellite j and reference satellite r the phase relationship is:

$H=[\Delta x^r_m/R^r_m-\Delta x^j_m/R^j_m, \Delta y^r_m/R^r_m-y^j_m, \Delta z^r_m/R^r_m-\Delta z^j_m/R^j_m, 0,0, \ldots 1,0, \ldots 0];$ The pseudorange relationship is:

$H=[\Delta x^r_m/R^r_m-\Delta x^j_m/R^j_m, \Delta y^r_m/R^r_m-\Delta y^j_m/R^j_m, \Delta z^r_m/R^r_m-\Delta z^j_m/R^j_m, 0,0, \ldots 0, \ldots 0]$ The Kalman filter mechanization is as follows:

Gain: $K_k=P_k(-)H_k^T[H_kP_k(-)H_k^T+R_k]^{-1}$

Covariance Update: $P_k(+)=[I-K_kH_k]P_k(-)$

State Update: $X_k(+)=X_k(-)+K_k[Z_k-H_kX_k]$ where R=Observation covariance matrix (scalar for phase and pseudo range observations) and is the same as the $C_x$ matrix (below) for the position update; and z=Observation (pseudo range or carrier measurement)

In the pseudo range and phase measurement implementation, the observations are decorrelated and the updates are done serially, one for each observation. With the position constraint information from the track model, the observation/state relationship is:

$$H = \begin{vmatrix} 1, 0, 0, 0, \ldots, 0 \\ 0, 1, 0, 0, \ldots, 0 \\ 0, 0, 1, 0, \ldots, 0 \end{vmatrix}$$

H=[I,0] with I=3×3 and 0=3x(n−3), (n=number of states) and $C_x$ is the covariance matrix of the constraint position:

$C_x=J^TC_tJ$ where
 $C_t$=The covariance matrix of the position in the "triangle" (or planar section) fame; and
 J=The rotation matrix used to rotate a vector from the triangle frame to the ECEF frame.

In one embodiment, the covariance matrix of the position in the triangle frame can be defined as:

$$C_t = \begin{vmatrix} 10000, & 0, & 0 \\ 0, & 10000, & 0 \\ 0, & 0, & 0.0001 \end{vmatrix}$$

that is, the parallel elements are more or less unknown, and the normal element is known to 10 cm at 1 sigma.

The results of the RT20 process is a vector which can be applied to the base station ECEF position (also transmitted to the local receiver with the differential observations) to give an ECEF position of the local receiver. The RT20 vector becomes more accurate as time goes on, so the local position accuracy also becomes more accurate.

The RT20 filter computes a vector between the base station and the local or rover receiver. In the absence of any track model the derived position will be Base Position plus RT20 vector. If the base station coordinates are in error relative to the relevant frame, then there will be a reported mismatch between the items in the true ECEF frame and the ECEF positions reported by the receiver. In order to account and remove this mismatch, the base station's transmitted position can be shifted by the amount of the mismatch and then the true and reported positions should be the same.

The mismatch is determined by a reconciliation process that is done prior to each race (or other event). In one embodiment, the data is reconciled by shifting the base station coordinates in the track model by an offset. The offset is determined by comparing the position of a stationary object in the track model with an accurately surveyed position for that object. In another embodiment, the reconciliation process is determined by comparing the track model normal constraint with the precise GPS position in the direction normal to the track model section applicable to the GPS position. This comparison is given by ω:

$\omega=R_e^P{}_{(Row\ 3)}(Pos_{RT}-Pos_{TM})$ where
 $R_e^P$=the rotation matrix used to transform a vector from the ECEF to "triangle" frame;
 $Pos_{RT}$=the unconstrained GPS ECEF position and
 $Pos_{TM}$=the track model constraint position in the ECEF frame;

Note that ω is just the third element of the vector, because this is the part in the direction normal to that pertinent triangle.

The following estimation process can be used to determine the offsets required to reconcile the base station and track model reference frames. The offset between the base station frame and the track model frame is reflected in triangle frame coordinates as $x^t_3=x^e \circ n_3$. The observation equation that models this vector component is:

$\omega=x^e \circ n_3=R_e^P{}_{(Row\ 3)}(Pos_{RT}-Pos_{TM})$ or $\omega=x^e \circ n_3=U_3^TR_p^e(Pos_{RT}-Pos_{TM})$ where:
 $x^e$=Base station shift in the ECEF frame,
 $x^t_3$=z component of base station shift in triangle frame
 $n_3$=normal vector to the triangle in the ECEF frame,
 $R_p^e$=the rotation matrix used to transform a vector in "triangle frame" coordinates to the ECEF frame;

$U_3$=unit vector normal to the triangle in the "triangle frame" $U_3=[0,0,1]^T$; and o=dot product operator.

Note that $n_3$ is simply the transpose of the last column of $R_p^e$. A least squares estimate can easily be generated from this ω via $$X=(\Sigma(A^TA))^{-1}\Sigma(A^T\omega)$$

where:

$$A_i=n_{3i}=R_{p\,i}^e U_3$$

The summation goes from i=1 to the number of RTK observations on the model. In order for this to work, a model with reasonable variation of normal vectors has to be used if all three components are to be observable.

The track model constraints improve the positioning accuracy significantly, up to a factor of 10 in many cases and sometimes more. In most cases, the improvement is in height, but in conditions of poor geometry the horizontal accuracy is also much better (sometimes more than 100 times better) in the constrained case. The horizontal accuracy also improves depending on the slope of the constraining section with respect to the local level because if there is a significant slope, then a component of the planar section's normal vector will be parallel to the local level plane.

In some embodiments, the track model is extended (extrapolated) outside the ribbon of the track so that bad geometry cases also have the use of a planar constraint.

In some embodiments, the track model constraints only work in the cases where there are at least four satellites. In other embodiments, the track model can be used when providing a degraded solution by accepting fewer observations as the required minimum number in either the least squares process or the RT20/Kalman filter.

Figure 9:
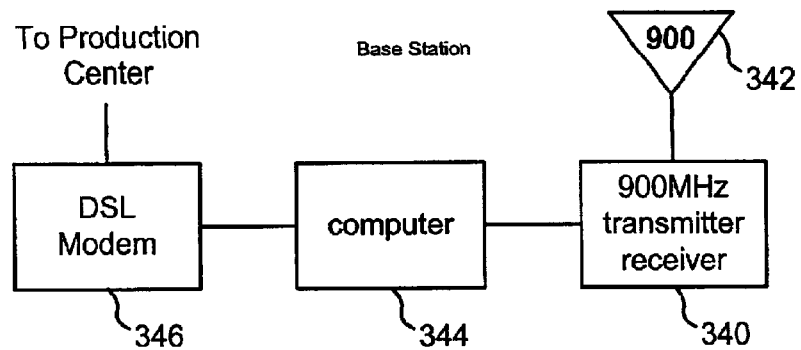
FIG. 9 is a block diagram of a base station.

FIG. 9 is a block diagram of a base station. FIG. 9 shows 900 MHz transmitter and receiver 340 connected to antenna 342 and computer 344. Computer 344 is connected to DSL modem 346, which is in communication with a DSL modem at production center 50. In general, each base station receives communications from all the cars with DAPS units that are in range of the base station and forwards the received information to production center 50. In addition, information from production center 50 is received by all of the base stations and retransmitted to all of the DAPS units within range of the particular base stations.

Figure 10:
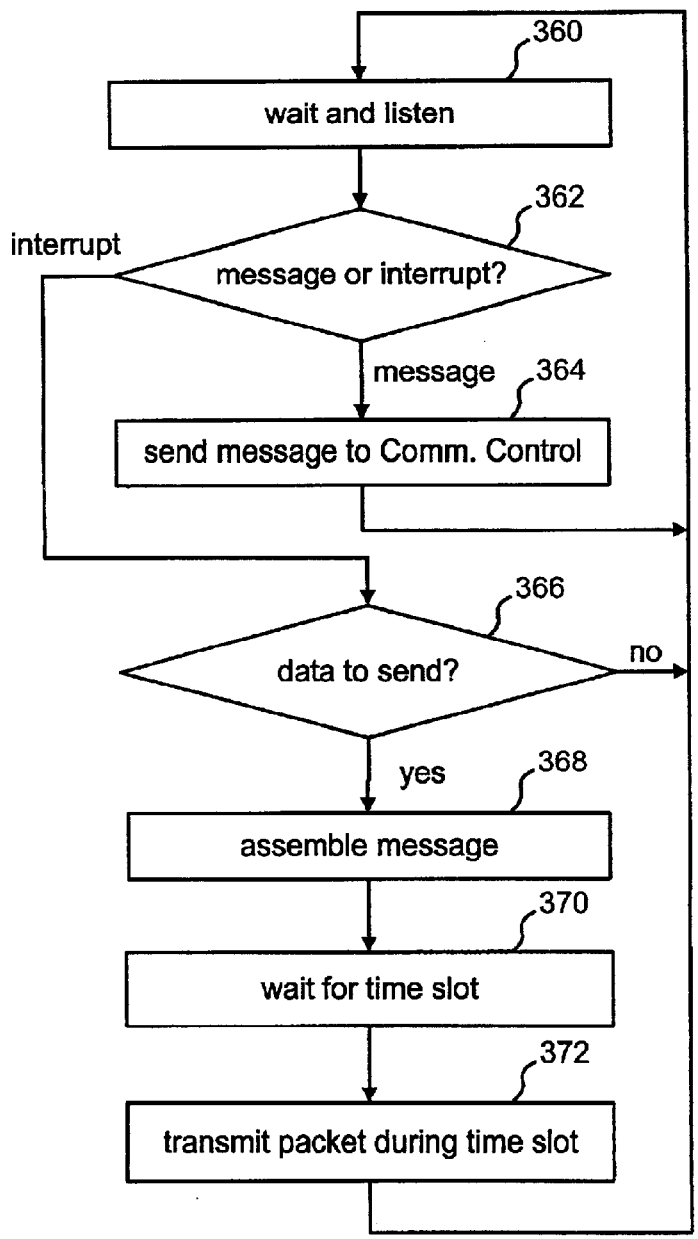
FIG. 10 is a flow chart describing the operation of the base station.

FIG. 10 is a flowchart describing the operation of a base station. In step 360, the system waits for its allotted time slot. While waiting, the system is listening for incoming messages from DAPS units. If an incoming message is received (step 362), that message is communicated to communication control computer 520 (see FIG. 13) at the production center 50 in step 364 and the method loops back to step 360. If an interrupt is received (step 362), then the system determines whether there is any data to send to the DAPS units (step 366). If there is no data to send, the method loops back to step 360. If there is data to send, the message is assembled in step 368. The system waits for its time slot in step 370 and transmits the message during its time slot in step 372. After step 372, the method loops back to step 360. The messages sent in step 372 are messages that originated from the production center 50.

Figure 11:
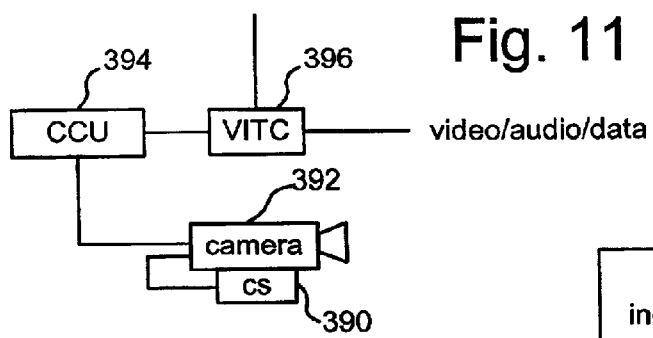
FIG. 11 is a block diagram of the components at a camera location.

FIG. 11 depicts an example of a camera location, including camera 392 with camera sensors 390. The camera sensors could include any or all of the following: optical shaft encoders, fiber optic gyros, inclinometers, and reading voltages from the lens (e.g. 2X Extender, focus, zoom). More information about camera sensors and cameras can be found in U.S. patent application Ser. No. 09/472,635, "Measuring Camera Attitude," filed on Dec. 27, 1999, incorporated herein by reference. Other camera sensors can also be used. Data from camera sensors 390 are sent to production center 50. In one embodiment, the camera sensor data for a given camera is transmitted to production center 50 via the camera's audio channel. The production center includes hardware to demodulate the audio channel. In some instances, the production center is in a truck at the event. The video from camera 392 is sent to camera control unit 394, which controls various video and optical parameters for camera 392. The output of camera control unit 394 is sent to VITC inserter 396 which adds a time code and unique camera identifier into the vertical blanking interval of the video from camera 392. The output of VITC inserter 396 is transmitted to production center 50. The present invention can be operated using one or more instrumented cameras. In one embodiment, the present invention is operated with six instrumented cameras. Each of the six cameras has its own CCU and its own VITC inserter. Each camera=s VITC inserter is synchronized with master VITC 506 (see FIG. 13). In alternative embodiments, the present invention can be used with fixed, non-instrumented cameras. In another alternative, the present invention can be used with non-instrumented cameras that are not fixed, in combination with image recognition.

Figure 12:
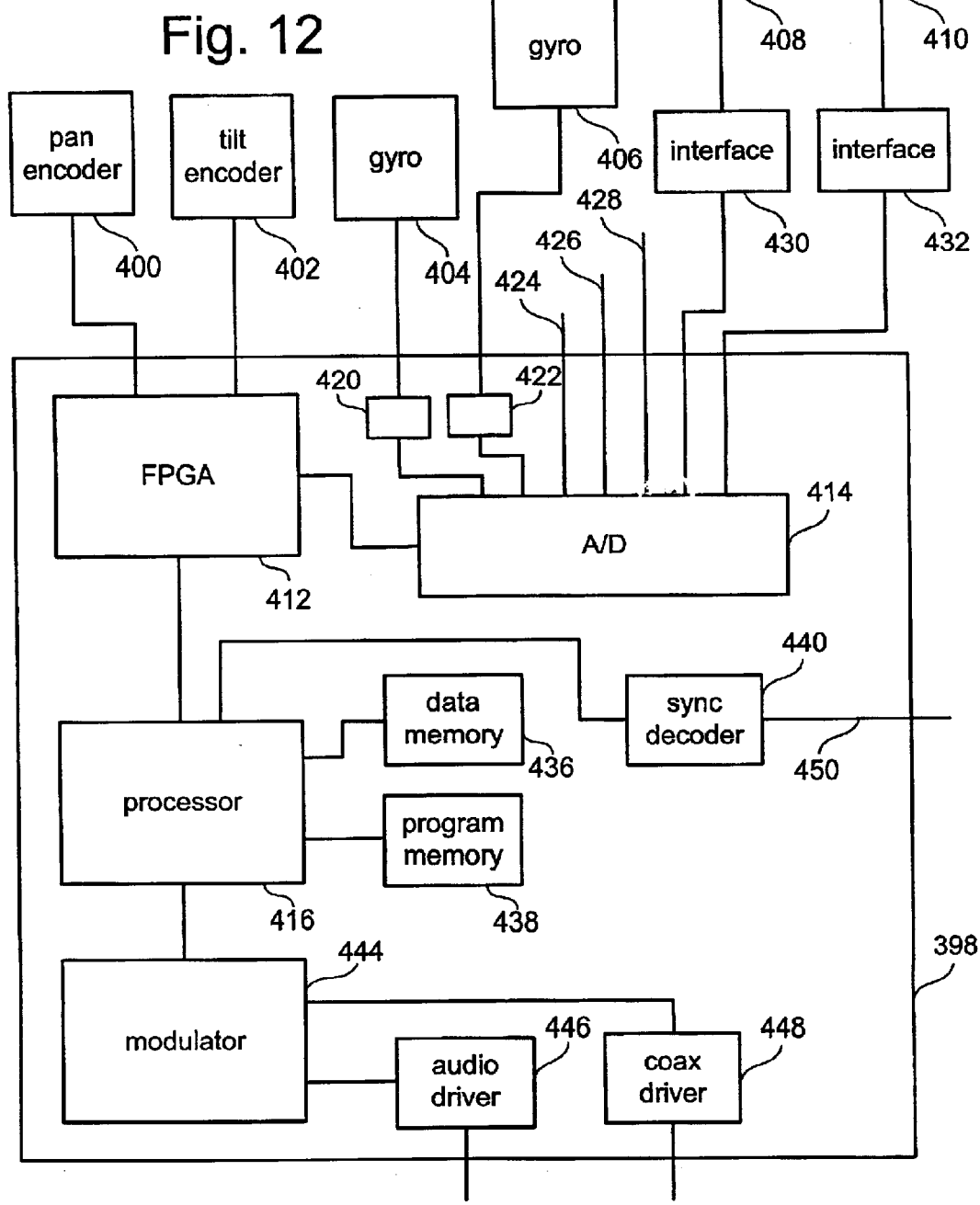
FIG. 12 is a block diagram of the remote camera sensor electronics.
Figure 22:
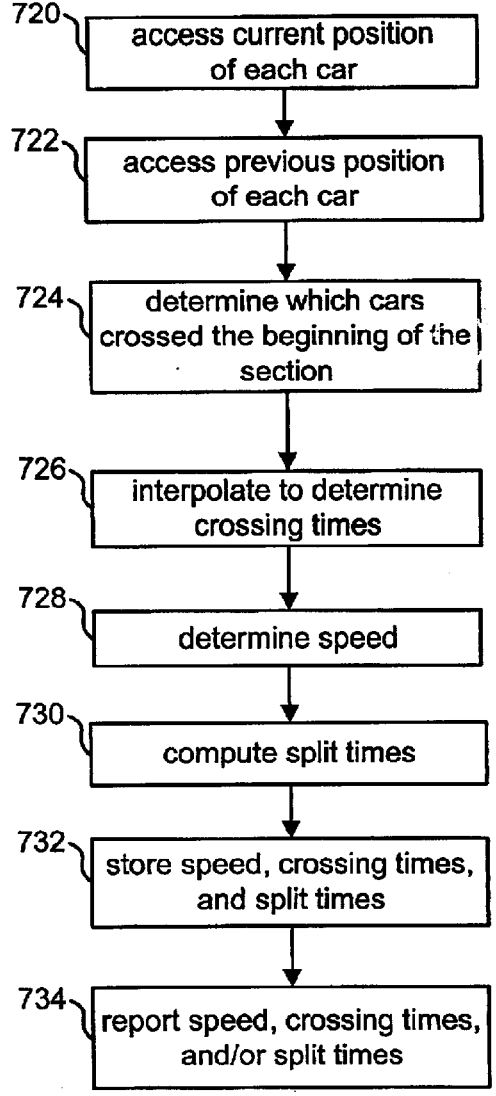
FIG. 22 is a flow chart describing the process for implementing virtual loops.

FIG. 12 shows a block diagram of the electronics for using the camera attitude sensors. FIG. 22 shows pan encoder 400, tilt encoder 402, gyro 404, gyro 406, inclinometer 408 and inclinometer 410. The output of pan encoder 400 and tilt encoder 402 are sent to FPGA 412. Pan encoder 400 and tilt encoder 402, in one embodiment, are optical encoders that output a signal which is measured as a number of counts (or pulses) that indicate the rotation of a shaft. The output signal is a quadrature signal indicating rate and direction. FPGA 412 decodes the signal from the optical encoders to output a count. FPGA 412 also controls analog to digital converter 414 and provides interface logic for processor 416. In regard to the analog to digital converter 414, FPGA 412 provides interface logic and a buffer, including a register to store a value for each sensor connected to analog to digital converter 414.

Gyro 404 is connected to interface board 420, which is connected to analog to digital converter 414. Interface board 420 comprises electronics for receiving a signal from gyro 404 and presenting the information to analog to digital converter 414. The electronics of board 420 includes a differential amplifier and other electronics which can reject common mode noise and amplify the signal from the gyro. The output of gyro 406 is connected to interface board 422. Interface board 422 operates in the same manner as interface board 420 and is also connected to analog to digital converter 414.

Signal 424 represents the electrical output of the zoom lens potentiometer of the camera and is connected to analog to digital converter 414. Signal 426 represents the electrical output of the 2X extender of the camera and is connected to analog to digital converter 414. Signal 428 represents the connection to the lens of the camera, provides the value of the focus of the camera and is connected to analog to digital converter 414.

The output of inclinometer 408 is connected to interface electronics 430. The output of inclinometer 410 is connected to interface electronics 432. The outputs of interface board 430 and interface board 432 are both connected to analog to digital converter 414. Analog to digital converter 414 converts the input analog signals to digital signals, and sends the output digital signals to FPGA 412. FPGA 412 includes a register for each of the sensors.

Processor 416 is in communication with data memory 436 for storing data and program memory 438 for storing program code. In one alternative, memory 438 is a flash memory and memory 436 is a static RAM. In one embodiment, processor 416 is an 8032 processor from Intel. Processor 416 also receives an output signal from sync decoder 440. Sync decoder 440 receives a video signal 450 from the camera and generates a sync signal so that the data from the sensors can be synchronized to the video. In one embodiment, the video is transmitted at 30 frames per second. Other video rates can also be used. Processor 416 assembles data from each of the sensors into a packet and sends the data to modulator 444. Processor 416 assembles the data using the sync signal so that data is collected and sent in synchronization with the video from the camera. For example, data can be sent for every field, every video frame, every other video frame, every third video frame, etc.

Modulator 444 receives the packet of data from processor 416 and encodes data for transmission on an audio frequency signal. The output of modulator 444 is sent to audio driver 446 and coax driver 448. Most broadcast cameras have a microphone input channel. The output of audio driver 446 is sent to the microphone input channel for the camera. The camera then combines the audio input channel with the video and sends a combined signal to the production equipment. If the audio signal is needed on a coax cable, then that signal is received from coax driver 248. In one embodiment, there can also be an RS232 or RS422 output directly from processor 216. More information about the system of FIG. 12 can be found in U.S. patent application Ser. No. 09/472,635, "Measuring Camera Attitude," filed on Dec. 27, 1999, incorporated herein by reference.

Figure 13:
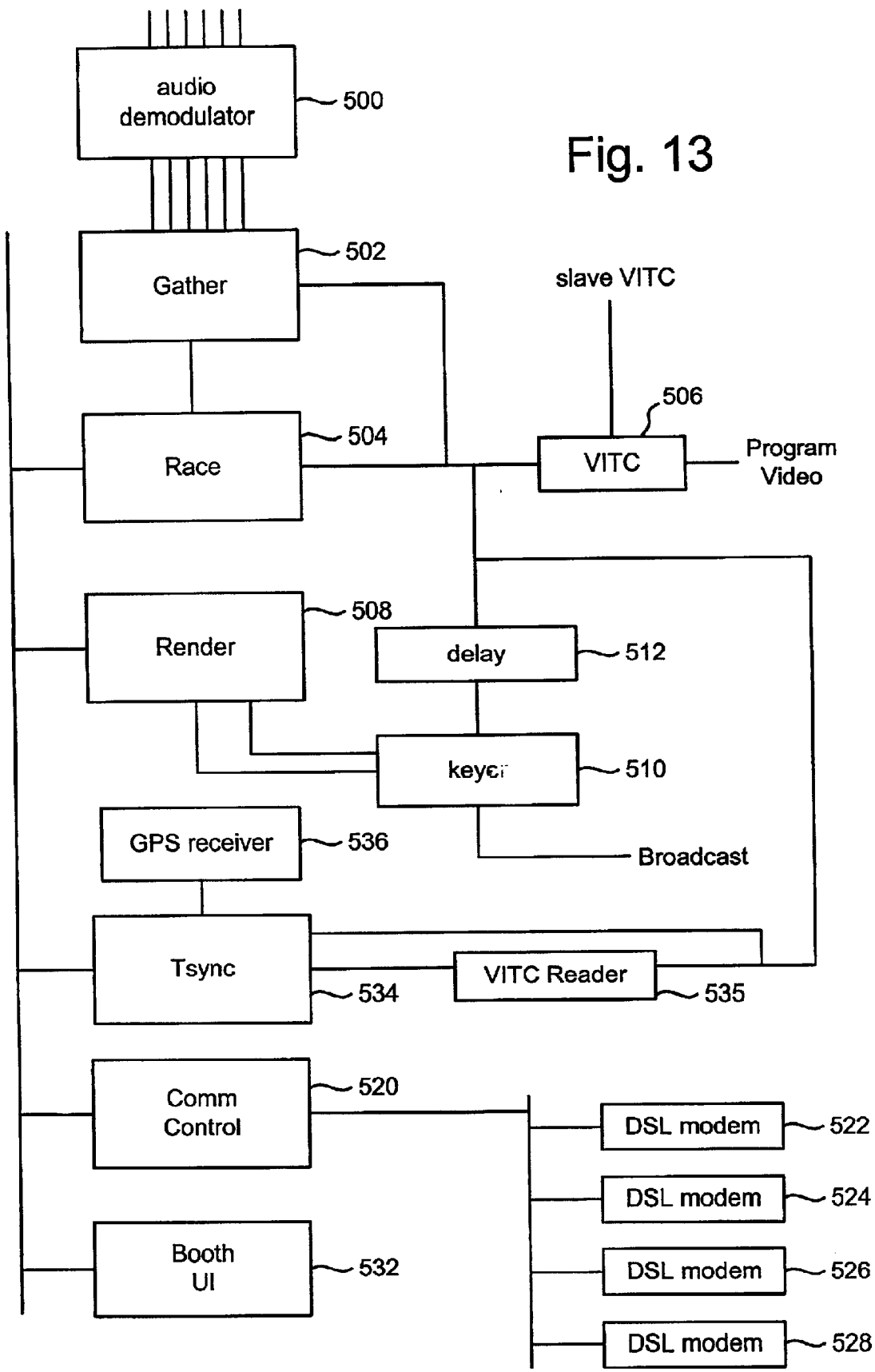
FIG. 13 is a block diagram of the components at the production center.

FIG. 13 is a block diagram of production center 50. Audio demodulator 50 receives the audio signals from each of the camera locations and demodulates the signals to remove the camera sensor data. The data is sent to gather computer 502, which is a Pentium based personal computer. Gather computer 502 acts as a central data concentrator, logger, synchronizer and forwarder. The computer receives camera data from the instrumented cameras and time code data from VITC 506. Gather computer 502 synchronizes and consolidates the time code and camera sensor data streams and forwards the data to race computer 504 via a serial line. Gather computer 502 is used to stamp VITC on the camera sensor data stream.

Race computer 504 receives program video with time code (via VITC 506), camera data from gatherer 502, vehicle data from communication control computer 520 and the camera identification information from the program video. Race computer 504 determines what camera is being used to provide the broadcast video (based on the camera identification inserted by VITC 396), what camera sensor data to use, what vehicles are selected to be highlighted and what data needs to be depicted in the video. It uses this information to send render computer 508 a description of the graphics to draw. Note that race computer 504, render computer 508, Tsync computer 534, communication control 520 and Booth UI computer 532 all communicate via an Ethernet.

Render computer 508 uses the information from race computer 504 to create an appropriate key and fill signals which are sent to keyer 510. Keyer 510 uses the key signal from render computer 508 to blend the graphics defined by the fill signal with the program video. The program video is provided to keyer 570 from video delay 512, which receives the program video from VITC 506. In one embodiment, all the cameras from an event send their video to a video production truck. The video production truck will include a switcher for choosing a video signal for broadcast. That chosen signal will be sent to VITC 506.

In one embodiment, gather computer 502, Tsync computer 534, communication control computer 520 and booth UI computer 532 are personal computers. Race computer 504 and render computer 508 are O2 computers from Silicon Graphics.

Communication control computer 520 is connected to DSL modems 522, 524, 526 and 528. Each of these DSL modems are in communication with a DSL modem at a base station. In one embodiment, there is one DSL modem connected to communication control computer 520 for each base station. Communication control computer 520 controls the flow of information between the DAPS units, the base stations and the production center 50. Communication control computer 520 communicates with the base stations via the DSL modems (in one embodiment over the same Ethernet as described above). Communication control computer 520 also receives differential GPS data from the GPS reference station 20 and sends that data to the base stations for transmissions to the DAPS units.

Booth UI computer 532 has a touch screen which displays all the available enhancements that the system can perform. An operator can touch the screen to choose a particular enhancement. This selection of enhancements is sent to communication control computer 520 and race computer 504.

Race computer 504 presents feedback to the booth UI, computer 532 which is transformed into a visual representation of confidence-of-measure and availability This is on a per-DAPS basis, and works for other DAPS equipped targets such as roving announcers. Race computer 504 also disables effects/enhancements if certain conditions (such as being in RT20 or better or having 2.5 meter standard. deviation or smaller) are not met. Race computer 504 smoothes small gaps in data via interpolation. The race computer also stores data (camera and DAPS) for use in replay (when used in concert with a tape striped with VITC 506). Render computer 508 interpolates the 2d coordinates of the objects in video between frames (i.e. field interpolation) since race computer 504 only computes positions per-frame.

Figure 14:
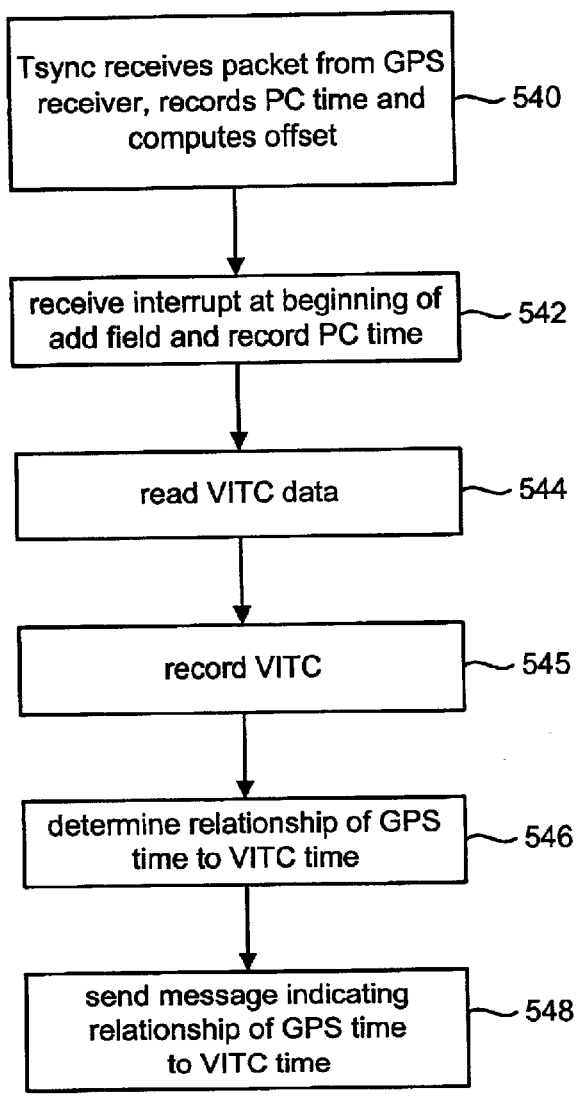
FIG. 14 is a flow chart describing the process of synchronizing GPS time and video time.

Tsync computer 534 is used to synchronize video time to GPS time. Tsync 534 is connected to a Trimble Pallisades GPS receiver 536, VITC reader 535 and VITC 506. FIG. 14 is a flowchart describing the operation of Tsync 534. GPS receiver 536 outputs the GPS time to Tsync 534 via an RS 422 line once per second. This message contains time, date and status. The receiver also outputs a 1 Hz pulse. At (within 1 us of) the top of every second, the pulse signals the time. Some milliseconds later, the message is output. Tsync computer 534 receives these events and records the PC system time when the events happen in step 540. Tsync computer 534 has a vertical sync detector installed on one of the ISA slots. This board generates an interrupt signal once at the beginning of every odd field (step 542). When this interrupt occurs, the Tsync computer 534 PC records the PC time. Tsync 534 is also reading VITC data from the VITC reader 535 (step 544). When the last character of a VITC packet is received, the VITC time (video time) is recorded. Tsync computer 534 interpolates between GPS time values, to determine a GPS time at the start of a frame. This determined GPS time is matched to the VITC value for that frame in step 546. In step 548, a message is sent from Tsync 534 to communication control 520 indicating a GPS time at the beginning of a frame and the VITC time at the beginning of the same frame. This relationship is used by the system to match GPS data with the appropriate video frame (see step 564 of FIG. 15, below).

Figure 15:
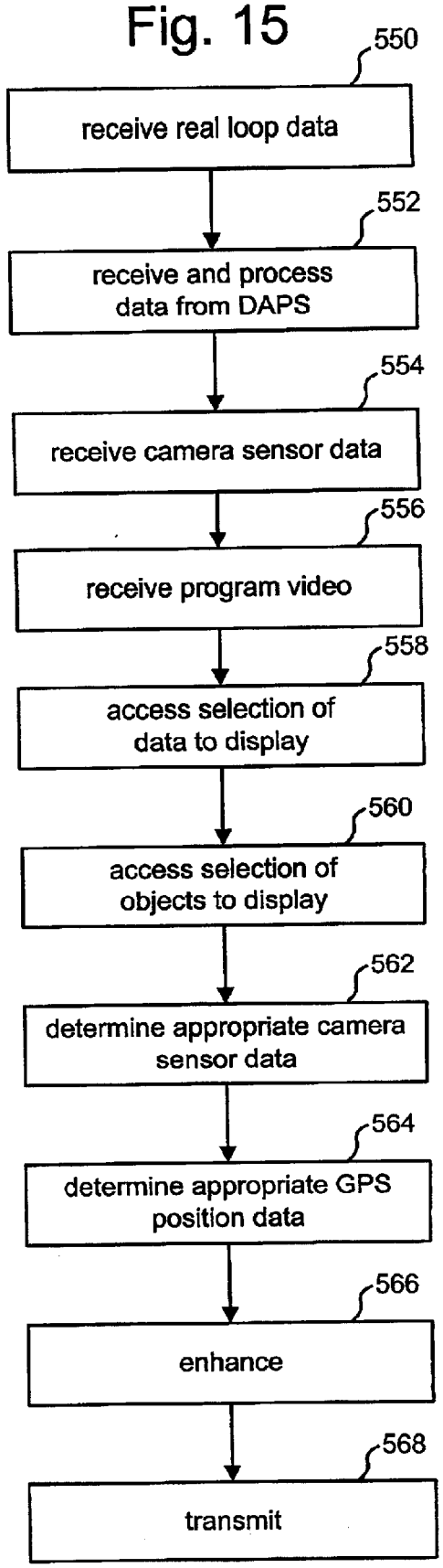
FIG. 15 is a flow chart describing the operation of the production center.
Figure 16:
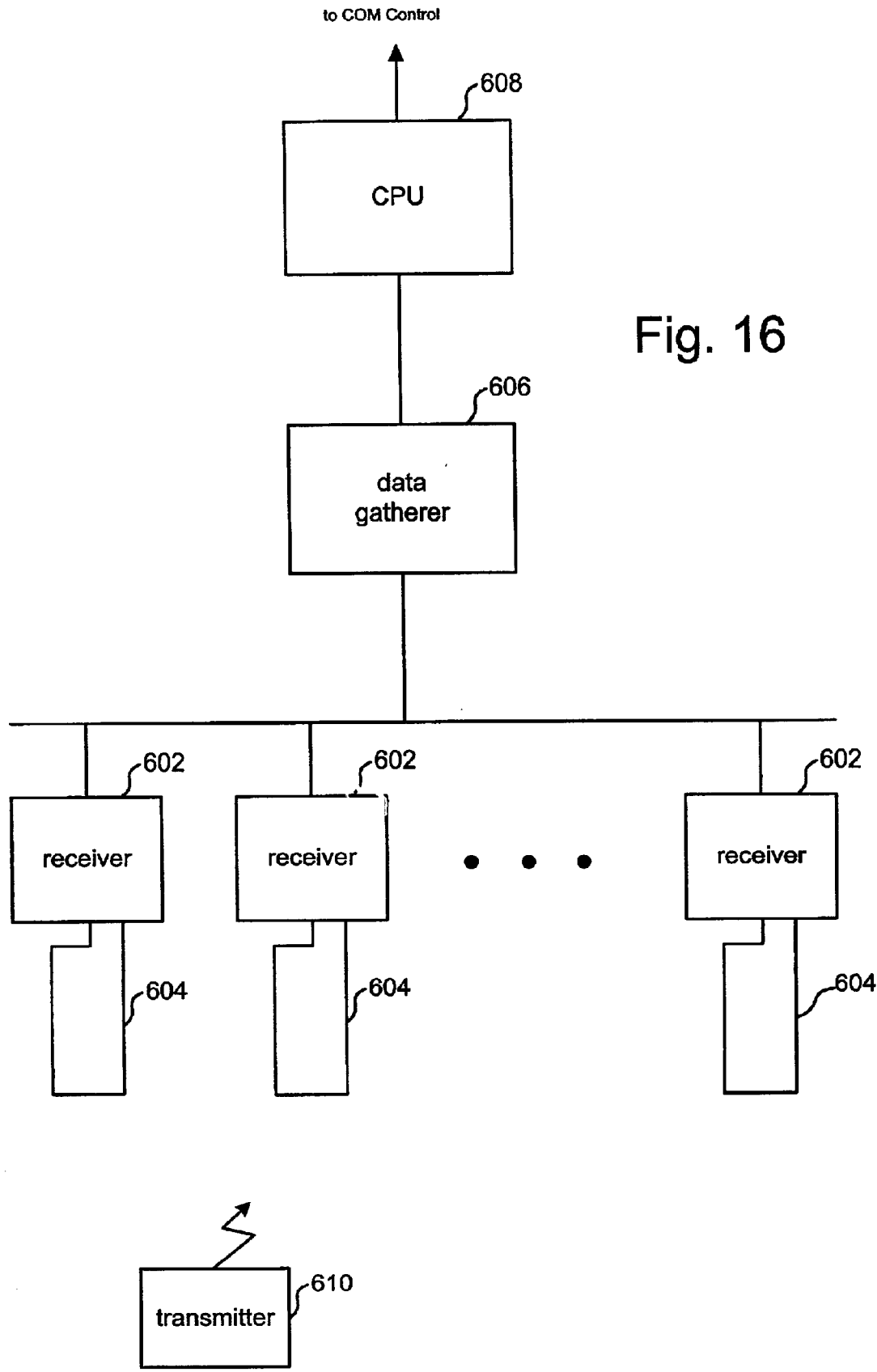
FIG. 16 is a block diagram of the components for providing physical loop data.

FIG. 15 is a flow chart describing the overall process performed at production center 50. In step 550, real loop data is received by communication control computer 520. FIG. 16 describes a system for providing real loop data.

FIG. 16 shows receivers 602. Only three receivers are depicted in the figure, however, it is contemplated that more or less than three receivers can be used. FIG. 16 also shows loops 604 connected to the receivers. Each loop is connected to one receiver. In one alternative, one receiver may service multiple loops. FIG. 16 shows the loop with a rectangular-like shape. However, the current invention contemplates other shapes being used. The receivers are connected to data gatherer 606 via a network (e.g. Ethernet). Data gatherer 606 is connected to computer 608. FIG. 16 also shows transmitter 610 which transmits an RF signal to loop 604. Instead of an RF signal, an inductive coupling can also be used.

In the embodiment for use with an auto race, each car would have a transmitter 610 (or transponder) mounted on the car that uniquely identifies the car by transmitting a unique code or frequency. Loops 604 are located below the surface of the race track, road or other surface. As the transmitter passes over a loop, the loop receives a signal from the transmitter. Based on the received signal, receiver 602 identifies the transmitter and the time when the signal was received and stopped being received. Receiver 602 sends this information to data gatherer 606. Data gatherer 606 compiles all the information from all the different receivers 602 and sends the compiled information to computer 608 for final analysis and storage. Data can then be sent from computer 608 to communication control computer 520. In one embodiment, the functions of data gatherer 606 and computer 608 can be performed by a single device. In another embodiment, data gatherer 606 may perform some of the calculations (e.g. speed and position) and then send a smaller data stream to computer 608.

In one embodiment, loop 604 is an insulated electrical wire. Loops other than wires can be used. In one embodiment, loop 604 acts as an antenna receiving RF signals. In another embodiment, loop 604 is used as a component of an inductive coupling system. Loops are typically placed below the surface of the road or track. Most loops will detect the presence of a transmitter crossing over the middle of the loop with sub-millisecond accuracy and a resolution of better than one ten-thousandths of a second. In one embodiment, the loop and transmitter should be mounted such that they are within twenty four inches of each other when the transmitter is passing over the loop. One implementation includes only using one loop 604, and locating that loop at the Finish Line of the race track.

Receiver 602 processes the raw signals picked up by loop 604. In one embodiment, it is the job of receiver 602 to convert the raw signals into digital information that can be transmitted to data gatherer 606. Each receiver stores a transmitter identification number, the crossing time and other data for each detection of a signal. Under normal operation, the data from the receiver is uploaded and processed as information is received from the loop Looking back at FIG. 15, step 550 includes receiving loop data from computer 608. After receiving the real loop data in step 550, the system receives and processes data from the DAPS in step 552. That is, communication control 520 receives data from the base stations that was originally transmitted from the DAPS units. In step 554, camera sensor data is received via audio demodulator 500 and gatherer computer 502. In step 556, program video is received. In step 558, race computer 504 and/or communication control 520 will access the selections of what data to display, which were inputted via booth UI computer 532. In step 560, the selection of objects to highlight will be accessed by communication control computer 520. In step 562, race computer will determine which camera sensor data to use. That is, each of the video signals had a unique identifier added to the vertical blanking interval (VBI). Race computer 504 will read the VBI of the program video and determine which camera was selected for broadcast. Then, the camera sensor data received via gatherer 502 for the chosen camera will be accessed in step 562. In step 564, the appropriate GPS position data will be accessed by race computer 504. In one embodiment, communications control computer 520 sends all of the data to race computer 504 and race computer 504 picks out the data that it needs. In step 566, the video is enhanced. In step 568, the enhanced video is transmitted for broadcast or storage on a tape or other medium. The steps of FIG. 15 do not necessarily need to be performed in the order depicted in the drawing.

Figure 17:
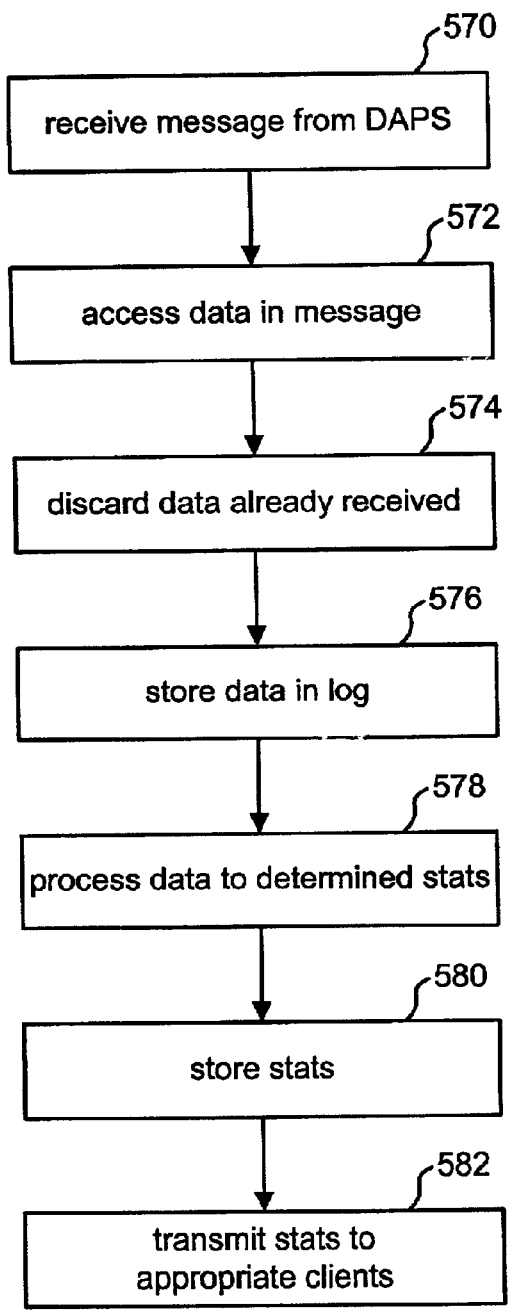
FIG. 17 is a flow chart describing the method of receiving and processing data.

FIG. 17 is a flowchart describing the method of receiving and processing data from the DAPS units (step 552 of FIG. 15). In step 570, a message is received from a DAPS unit, via a base station, at communication control computer 520. In step 572, communication control computer 520 accesses the data in the message and stores the data in logs. In step 574, any data that has already been received by communication control 520 will be discarded. In step 576, data that has not been discarded is stored in a log. In step 578, the data is processed to determine certain statistics. In step 580, the determined statistics are stored. In step 582, the data and/or statistics are transmitted to the appropriate clients (e.g. race computer 504).

Figure 18:
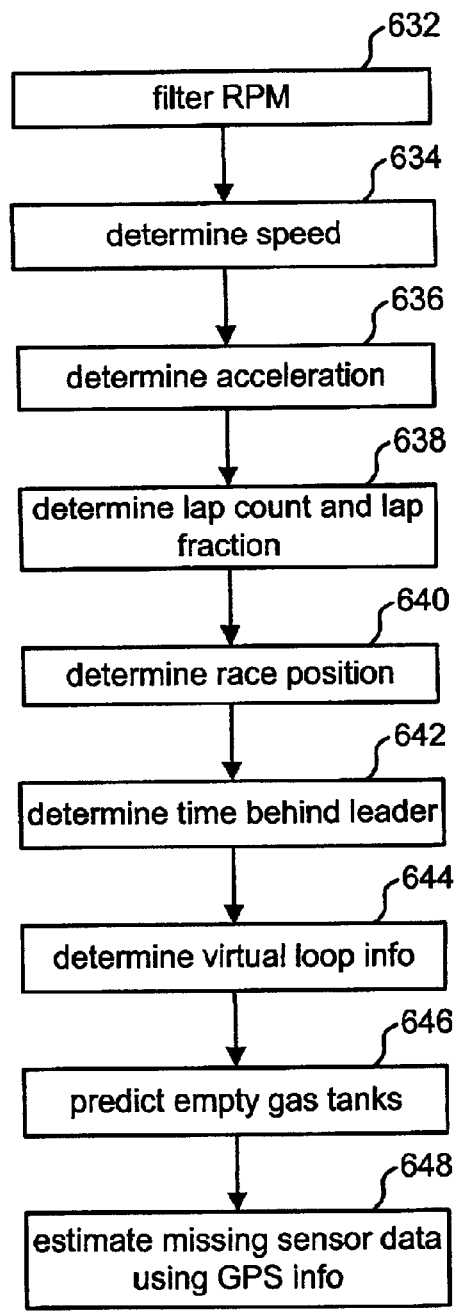
FIG. 18 is a flow chart describing the method of processing data.

FIG. 18 is a flowchart describing the method of processing data to determine statistics (see step 578 of FIG. 17). In step 632, RPM data is filtered. In one embodiment, any values above 10,000 are discarded and the remaining values are subjected to a simple IIR filter (filteredrpm=½filteredrpm+½rpm). In step 634, the velocity of each automobile is determined based on two position measurements and times (V=distance divided by time). In step 636, acceleration is determined for each of the DAPS units. In step 638, a lap count and lap fraction is determined for each DAPS unit. Each lap around the track is counted and each fraction of a lap is counted (e.g. the lap fraction). In step 640, the race position is determined. That is, whether the driver is in first place, second place, third place, etc. In step 642, it is determined how far (in terms of time) each car is behind the leader car (the first place car). In step 644, virtual loop information is determined. In step 646, the system predicts when one or more of the cars will run out of fuel. In step 648, missing sensor data can be estimated using the GPS information. The method of FIG. 18 is primarily performed by communication control computer 520. The steps of FIG. 18 can be performed in a different order than as depicted in the drawing.

Figure 19:
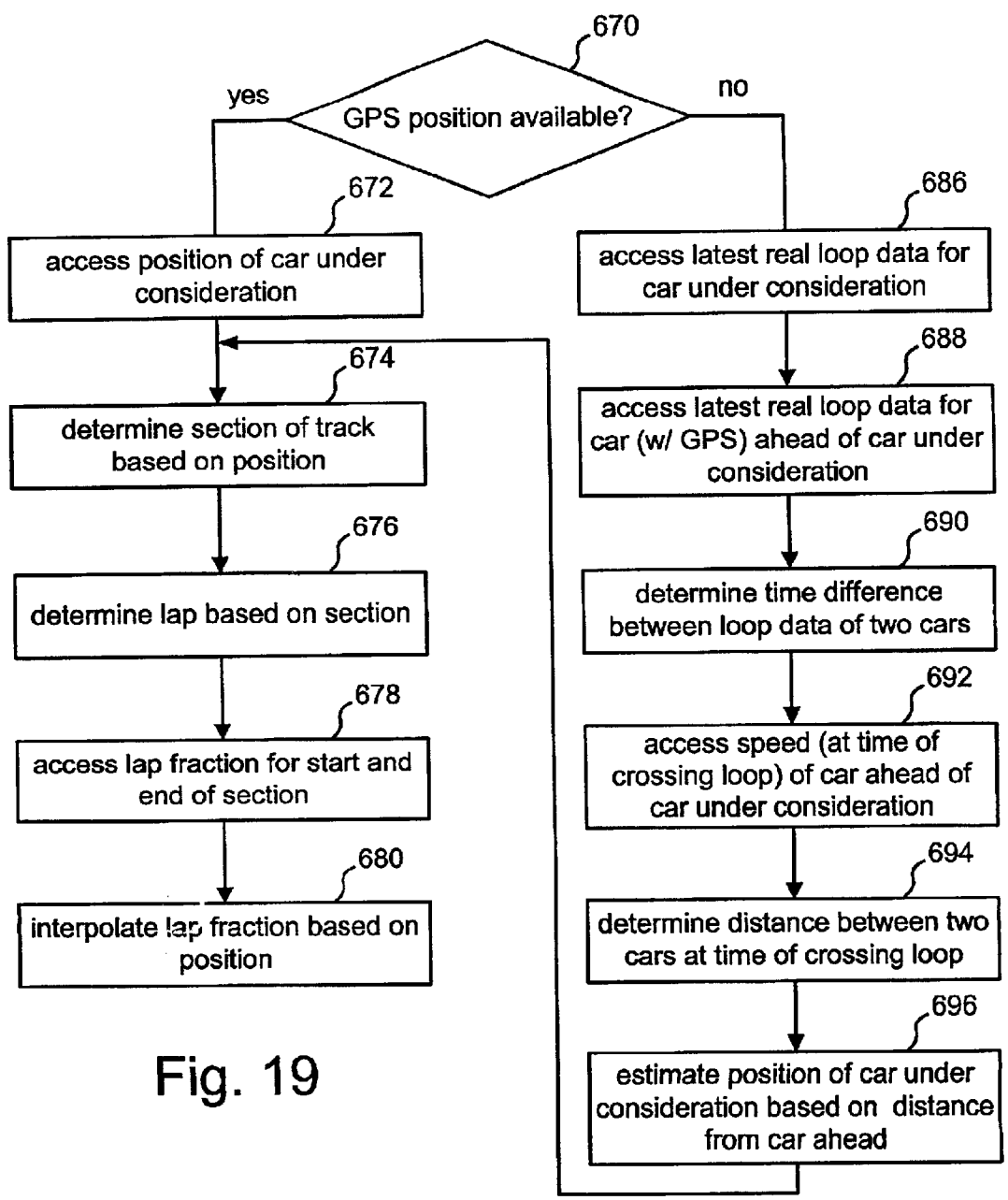
FIG. 19 is a flow chart describing the process of determining a lap number and lap fraction.
Figure 20:
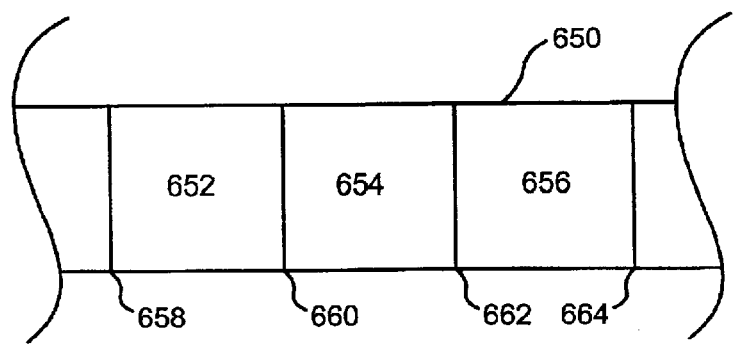
FIG. 20 depicts a portion of a race track, divided into sections.

FIG. 19 is a flowchart describing the method of determining the lap count and lap fraction (step 638 of FIG. 18). To aid in determining lap fractions, a racetrack (or other track or surface) is broken up into a number of sections, with each section having borders. For example, FIG. 20 shows a portion of racetrack 650 broken up into a number of sections 652, 654 and 656. In FIG. 20, the sections are rectangular, however other shapes can be used. For example, at curved portions of a track, a section can be trapezoidal in shape. Section 652 has beginning border 658 and end border 660. Section 654 has beginning border 660 and end border 662. Section 656 has beginning border 662 and end border 664.

FIG. 19 describes a process for determining lap numbers and lap fractions. The process of FIG. 19 is performed for each DAPS unit. In step 670, it is determined whether there is GPS determined position data currently available for the DAPS unit under consideration. If so, the method loops to 672 and accesses the GPS determined position of the car under consideration. In step 674, the system determines which section of the track the car is on based on the position from step 672. In step 676, the system determines what lap the car is on based on what section the car is in and the previous lap stored for the car. Prior to the race, the beginning border of each section is pre-assigned with a lap fraction. In one embodiment, the track is broken into one hundred equally spaced sections so that the first section is at lap fraction 0, the second section is at lap fraction 0.01, the third section is lap fraction 0.02, etc. The system will store the previous lap fraction and lap number. By knowing the new lap fraction, the system can determine whether the car has crossed the finish line, thus, starting a new lap. In step 678, the system accesses the pre-stored lap fractions for the start border of the section the car is currently in and the next section. While the car may be exactly at one of the borders, it is likely to be between the borders. Therefore, in step 680, the system interpolates the lap fraction based on the two borders.

If it is determined in step 670 that there is not a current GPS determined position available for the car under consideration, the method loops to step 686. The latest real loop data for the car under consideration is accessed in step 686. The system also accesses the latest real loop data for the car directly ahead of the current car under consideration. In step 690, the system determines the difference in time between the loop data for the two cars. In step 692, the system accesses the previously recorded or computed speed of the car directly ahead of the car under consideration at the time of crossing the loop. This speed and time may need to be interpolated. In step 694, the distance between the two cars at the time of crossing the loop is determined based on speeds and time. This distance is assumed to be the distance between the two cars during the entire lap as long as no GPS data is available. Thus, in step 696, the system determines the current position of the car under consideration by subtracting the distance computed in 694 from the current position of the car directly ahead of it. After step 696, the method loops to step 694.

Once knowing the lap fractions for all the cars, the system can determine the race position (step 640 of FIG. 18) by ranking all the DAPS units based on lap and lap fraction.

Figure 21:
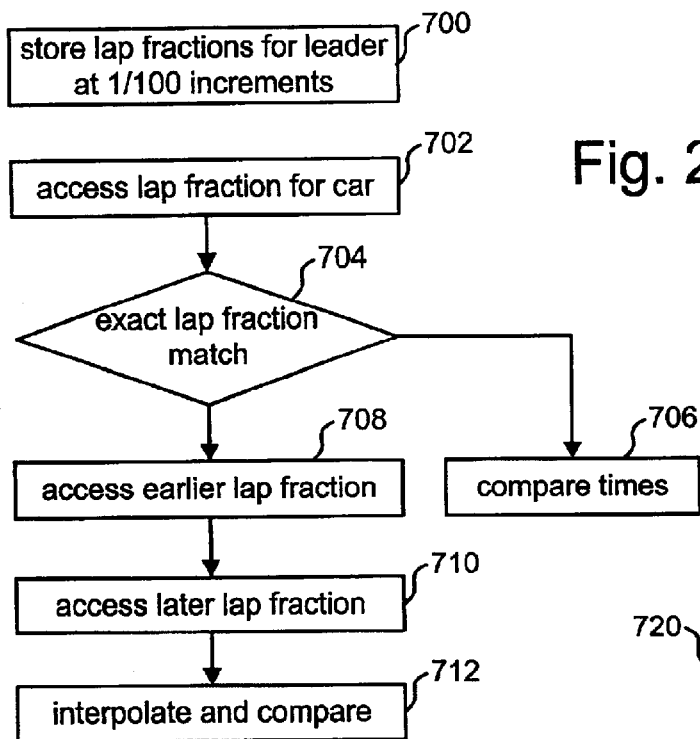
FIG. 21 is a flow chart describing the process for determining the time behind the leader.

FIG. 21 is a flowchart for describing the process for determining the time behind the leader (step 642 of FIG. 18). In step 700, the system stores the lap fractions and associated times at each lap fraction for the leader car at one hundred positions along of the track. More or less than one hundred positions can also be used. Steps 702–712 are then performed for each car for which the time behind the leader is to be computed. In step 702, the system accesses the lap and lap fraction for the car under consideration. In step 704, the system determines whether there is position data for the leader car at the exact same lap and lap fraction. If so, the times of the two cars are compared in step 706 to determine the time behind the leader. If not, then the lap fraction of the leader car just before the lap fraction of the car under consideration is accessed in step 708 and the lap fraction just after the lap fraction for the car under consideration is accessed in step 710. In step 712, the system interpolates the times for the two lap fractions of step 708 and 710 to determine the time the leader was at the same position as the current car under consideration. The time of the leader car and the time of the current car under consideration are compared to determine the difference, which is the time behind the leader.

FIG. 22 is a flowchart describing the method of determining virtual loop information (see step 644 of FIG. 18). Actual physical loops have been described above. In one embodiment, the system uses virtual loops. Rather (or in addition to) installing a real loop wire in the track, the system virtually creates loops and measures information about cars passing over these virtual loops using the GPS position data. FIG. 20 was used to explain how the track was divided up into sections. In one embodiment, the beginning of each section can be used as a virtual loop. In step 720 of FIG. 22, the system accesses the current position of each DAPS unit. In step 722, the system accesses the previous position of each car. In step 724 the system determines whether any of the cars have crossed the beginning of the section being used as a virtual loop. In one embodiment, there can be one virtual loop. In another embodiment, more than one virtual loop can be used in which case, step 724 will determine whether any of the virtual loops have been crossed. In addition to sections on the track, the pit area can also be divided into sections and a virtual loop can be created at the beginning or end of the pit area. Thus, the system can determine whether any cars entered the pit area or left the pit area, and how long the cars were in the pit area based on entrance and exit times.

For all cars that have crossed the virtual loop between the previous and current position, the system interpolates to determine the exact time the loop was crossed (step 726). In step 728, the system determines the speed at the time of crossing the loop by considering at the current position and the previous position. In step 730, any split times are determined. That is, in one embodiment, the system may determine split times between virtual loops. In step 732, the speed at the time of crossing the virtual loop, the crossing time and the split times are all stored. In step 734, any of the information stored in step 732 can be reported to race computer 504, or any other client.

Figure 23:
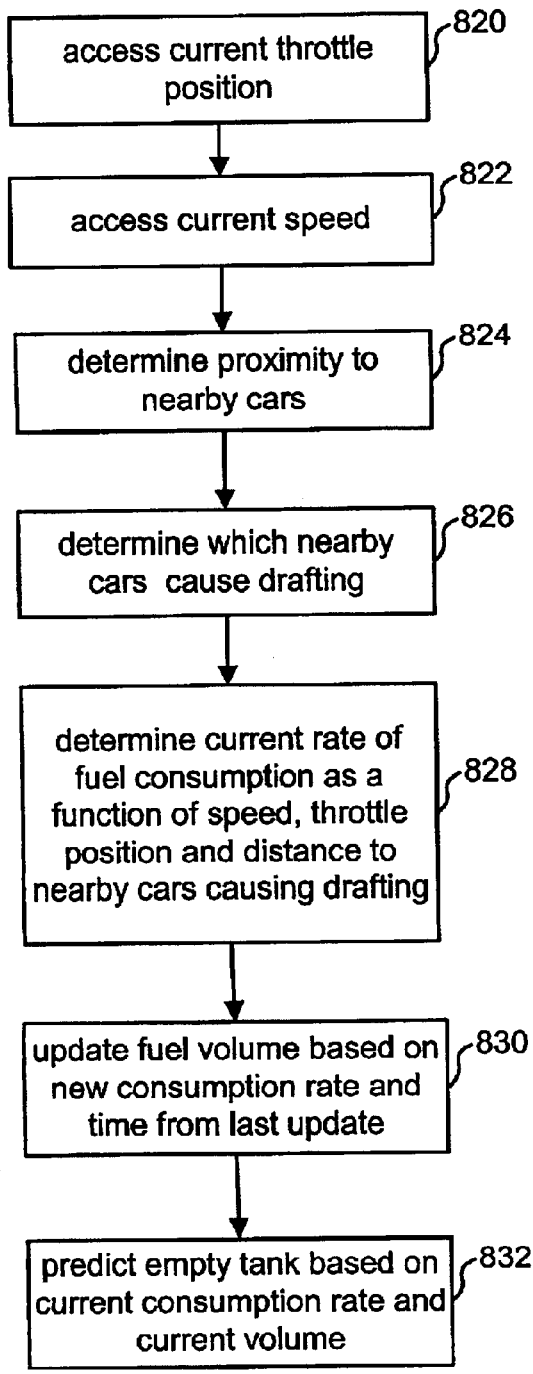
FIG. 23 is a flow chart describing the process for predicting when a car will run out of fuel.

FIG. 23 is a flowchart describing the process for predicting when a particular car will run out of fuel. The process of FIG. 23 can be performed for each car. In step 820, the system accesses the current throttle position for the car. In step 822, the system accesses the current speed for the car. The speed can be determined by looking at the current and previous positions (and associated times). In step 824, the system determines the proximity of the car under consideration to nearby cars. In step 826, the system determines which of the nearby cars cause a drafting effect for the car under consideration. In step 828, the system determines a current rate of fuel consumption as a function of speed, throttle position and distance to nearby cars that are causing drafting. In step 830, the system updates the fuel volume for the car based on the new consumption rate determined in step 828 and the time from the last update. In one embodiment, booth UI computer 532 is used by an operator to indicate when a car fills its gas tank. The volume of the tank is known in advance. The level of the fuel is then updated each iteration of step 830, with the process of FIG. 23 performed each time a GPS position is received. In step 832, the system makes a prediction of when the fuel tank will be empty based on the current consumption rate and the current volume. That is, current consumption rate multiplied by time will equal the current volume at a certain time, this time is calculated and reported.

Figure 24:
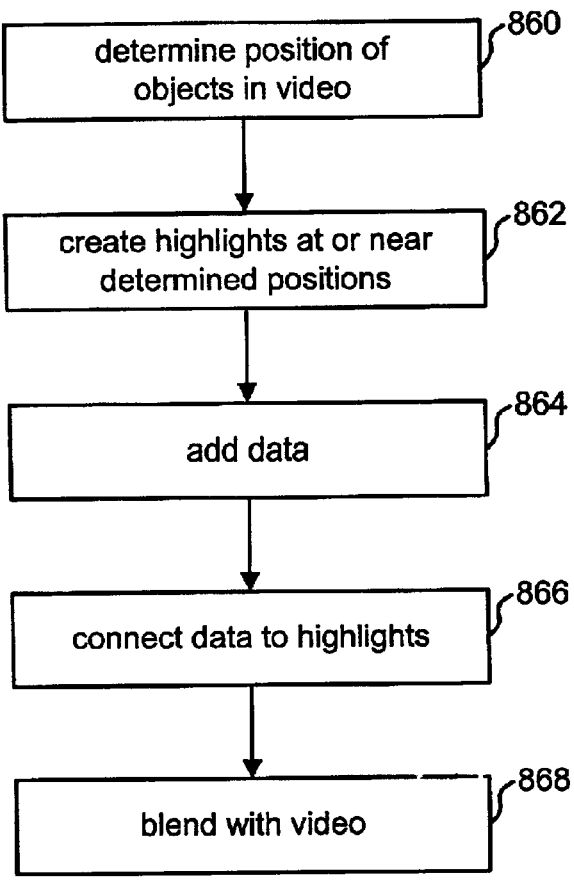
FIG. 24 is a flow chart describing the process of enhancing video.

Step 648 of FIG. 18 includes estimating missing sensor data using GPS information. That is, there may be situations when the sensors on the DAPS units are not able to sense or report data. In those instances, the system uses GPS derived information to estimate the missing sensor data. For example, the following equations explain how to estimate throttle position and brake position.

$$v_{x_n} = \left( \frac{(\lambda_n - \lambda_{n-1}) \cdot \cos(L_n) \cdot 60 \cdot 6072}{(t_n - t_{n-1})} \right)$$

$$v_{y_n} = \left( \frac{(L_n - L_{n-1}) \cdot 60 \cdot 6072}{(t_n - t_{n-1})} \right)$$

$$v_n = \sqrt{v_{x_n}^2 + v_{y_n}^2}$$

$$RPM_n = \left( \frac{v_n \cdot 60 \cdot R_g}{2\pi \sqrt{t}} \right) \cdot (1 + a_{L_n} \cdot \alpha_s)$$

$$a_{L_n} = \left( \frac{(v_n - v_{n-1})}{32 \cdot (t_n - t_{n-1})} \right) g$$

$$H_E = k(RPM - RPM_{MAX})^2 + H_{E_{MAX}}$$

$$F_d = \left( \frac{\frac{1}{2} C_d A \rho v^2}{32} \right)$$

$$F_R = r_r V$$

$$F_a = a_L \cdot M$$

$$F_w = F_a + F_R + F_d$$

$$H_w = \left( \frac{F_w \cdot r_t \cdot 2\pi \cdot RPM \cdot 60}{R_g \cdot 550} \right)$$

$$T = \left( \frac{100 \cdot H_w}{H_E} \right)$$

$$B = 100 \left( \frac{F_w}{M} \right)$$

where:

M=car weight (e.g. 3600 lb)
$I_n$=latitude at time n
$\lambda_n$=longitude at time n
$v_n$=velocity at time n
$v_{x_n}$=x component of velocity
$v_{y_n}$=y component of velocity
$R_g$=gear ratio
RPM=revolutions per minute
$r_t$=tire radius
$\alpha_{L_n}$=longitudinal acceleration at time n
$\alpha_s$=slip factor of tire
$H_\Sigma$=horsepower of engine at fall throttle as a function of RPM
$RPM_{max}$=RPM where horsepower is maximum
$H_{E_{max}}$=peak engine horsepower
K=engine horsepower constant
$F_d$=aerodynamic drag
A=frontal area
$C_d$=drag coefficient
$\rho$=air density=0.0801
$F_r$=rolling resistance drag
$r_r$=rolling resistance constraint
$F_a$=force from acceleration
$F_W$=force applied to wheels
$H_w$=horsepower applied to wheel
T=throttle position
B=brake position Step 566 of FIG. 15 includes enhancing the video. FIG. 24 is a flowchart describing more details of the process of enhancing the video. Before the process of FIG. 24 is performed, race computer knows which cars will be highlighted and what data (including statistics determined above) needs to be added to the video. In step 860, the positions in the video of the image of each of the cars to be highlighted is determined. The system already knows the three dimensional location of the cars in real space based on the GPS technology described above. These three dimensional locations are transformed to two-dimensional positions in the video in step 860. Enhancing video and transforming three-dimensional locations to two dimensional positions is known in the art and described in U.S. Pat. Nos. 5,912,700; 6,252,632; 5,917,553; 6,229,550; and U.S. patent applications Ser. Nos. 09/472,635, "Measuring Camera Attitude" filed on Dec. 27, 1999 and 09/425,992, "Telestrator System" filed on Oct. 21, 1999, all of the above listed patents and applications are incorporated herein by reference. In step 862, the system creates highlights at or near the positions determined in step 860. The following are examples of highlights that can be created: a cloud, circle, oval or other shape can be placed over a car; an ellipsoid can be placed over the car; an arrow or line pointing to the car can be added; an identification (such as a image of a driver, car number, sponsor, team name, etc.) can be added to the video at or near the car; or any other type of highlight can be used. In one embodiment, a frame or field of the video is created with the highlight at the appropriate position. In step 864, data can be added to the created field or frame of video. In one embodiment the data is added as text. In another embodiment, the data is added as graphics. The data could include driver name, car number, throttle position, RPM, brake position, speed, time behind the leader, current position in the race (e.g. first place, second place, etc.), split time, an indication of whether the car is in the pit area, time in pit area, speed, etc. In one embodiment, the data from step 864 is connected to the highlight from 862 by a line (step 866). In other embodiments the data is not connected to the highlight. In step 868, the data and/or highlights are blended with the video of the race using keyer 510 or another video modification unit.

Figure 25:
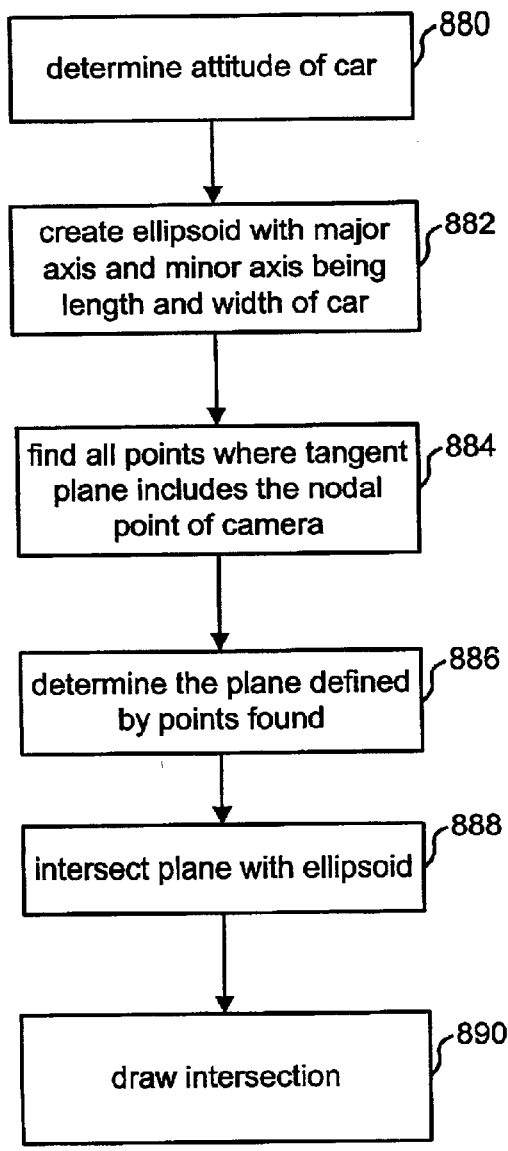
FIG. 25 is a flow chart describing the process of creating a highlight with an orientation determined based on the attitude of the car (or other object).

One embodiment described above includes using an ellipsoid as a highlight of a car or other object. In one embodiment, the orientation of the ellipsoid (or other shape) changes as the attitude of the image of the car changes in the video. FIG. 25 is a flowchart describing the process of providing an ellipsoid (or other shape) whose orientation changes as the attitude of the car (or other object) changes. In step 880, the system determines the attitude of the car. This is determined by comparing two successive positions of the car and assuming the attitude to be the direction from the first position to the second position. In step 882, an ellipsoid is created. The major axis and the minor axis of the ellipsoid are the length and width of the car. In step 884, the system finds all points on the ellipsoid that have a tangent plane that includes the nodal point of the camera providing the video of the race. The tangent plane of a point is a plane that touches that particular point under consideration and no other point on the ellipsoid. It turns out that all the points identified in step 884 will be in a plane. In step 886, the system determines that plane. In step 888, the plane determined in step 886 is intersected with the ellipsoid. The intersection of the plane and the ellipsoid is drawn in step

890. That intersection drawn in step 890 is the highlight added to the video at the position of the image of the car in the process of FIG. 24. As the attitude of the image of the car wheel changes, the shape and orientation of the ellipsoid will change. In one embodiment, the image drawn in step 890 is a solid. In another embodiment, the image is an outline with the center of the shape being clear. The equations below include math used to implement the process of FIG. 25.

A standard ellipse centered at the origin can be described by the equation, $$\frac{x^2}{a^2} + \frac{y^2}{b^2} + \frac{z^2}{c^2} = 1 \quad \text{(Equation 1)}$$

or with the matrix equation, $$[x \ y \ z \ 1] \begin{bmatrix} \frac{1}{a^2} & 0 & 0 & 0 \\ 0 & \frac{1}{b^2} & 0 & 0 \\ 0 & 0 & \frac{1}{c^2} & 0 \\ 0 & 0 & 0 & -1 \end{bmatrix} \begin{bmatrix} x \\ y \\ z \\ 1 \end{bmatrix} = 0 \quad \text{(Equation 2)}$$

Let S be the 4 by 4 matrix, $$S = \begin{bmatrix} \frac{1}{a^2} & 0 & 0 & 0 \\ 0 & \frac{1}{b^2} & 0 & 0 \\ 0 & 0 & \frac{1}{c^2} & 0 \\ 0 & 0 & 0 & -1 \end{bmatrix} \quad \text{(Equation 3)}$$

Then points on the standard ellipsoid can be given by the equation, $$[x \ y \ z \ 1] S \begin{bmatrix} x \\ y \\ z \\ 1 \end{bmatrix} = 1 \quad \text{(Equation 4).}$$

The general ellipsoid of a given orientation and location can be represented by rotating and translating the standard ellipsoid. Let points on the general ellipsoid be given by (x1,y1,z1). Then the (x1,y1,z1) points can be described by the equation, $$[x1 \ y1 \ z1 \ 1] = [x \ y \ z \ 1] R \cdot T, \quad \text{(Equation 5)}$$

where R is a four by four rotation matrix, and T is a four by four translation matrix. Let $$Mew = R \cdot T, \quad \text{(Equation 6)}$$

and $$Mwe = Mew^{-1}. \quad \text{(Equation 7)}$$

Then we have the equation, $$[x \ y \ z \ 1] = [x1 \ y1 \ z1 \ 1] Mwe. \quad \text{(Equation 8)}$$

Then points on the general ellipsoid can be described by the equation, $$[x1 \ y1 \ z1 \ 1] Mwe \cdot S \cdot Mwe^T \begin{bmatrix} x1 \\ y1 \\ z1 \\ 1 \end{bmatrix} = 0, \quad \text{(Equation 9)}$$

where $Mwe^T$ is the transpose of the matrix, Mwe. Let $$Mwe \cdot S \cdot Mwe^T = \begin{bmatrix} c11 & c12 & c13 & c14 \\ c21 & c22 & c23 & c24 \\ c31 & c32 & c33 & c34 \\ c41 & c42 & c43 & c44 \end{bmatrix}, \quad \text{(Equation 10)}$$

and let A=c11, B=c22, C=c33, D=c12+c21, E=c23+c32, F=c13+c31, G=c14+c41, H=c24+c42, I=c34+c43, J=c44. Let the nodal point of the camera model be (nx,ny,nz). Let A3=Fnz+2Anx+Dny+G, B3=Enz+Dnx+2Bny+H, C3=2Cnz+Fnx+Eny+I, and D3=Inz+Gnx+Hny+2J.

Then it can be shown that the intersection of the general ellipsoid and plane is described by the equation, $$A3x1 + B3y1 + C3z1 + D3 = 0. \quad \text{(Equation 11)}$$

The set of points on the ellipsoid whose tangent plane contains the nodal point all lie in a single plane. That plane is given in Equation 11.

In one embodiment of the system described above, the system can show phantom cars in a video that depicts actual cars racing. For example, during time trials, while a particular car is driving around the track, a phantom car showing the position of the leading car can be added to the video. Alternatively, while a driver of interest is being shown on television during a race, the position of another car during another running of the race (or other situation) can be depicted in the image. In one embodiment, the image of the phantom car is an image of a car added to each field of the video. In another embodiment, the phantom image will change orientation as appropriate for the particular segment of track. In one embodiment, the system determines the orientation of the track in the current video field or frame and creates a new car image with an orientation matching that of the track. In another embodiment, the system pre-renders images of a car for different orientations of the track or car.

Figure 26:
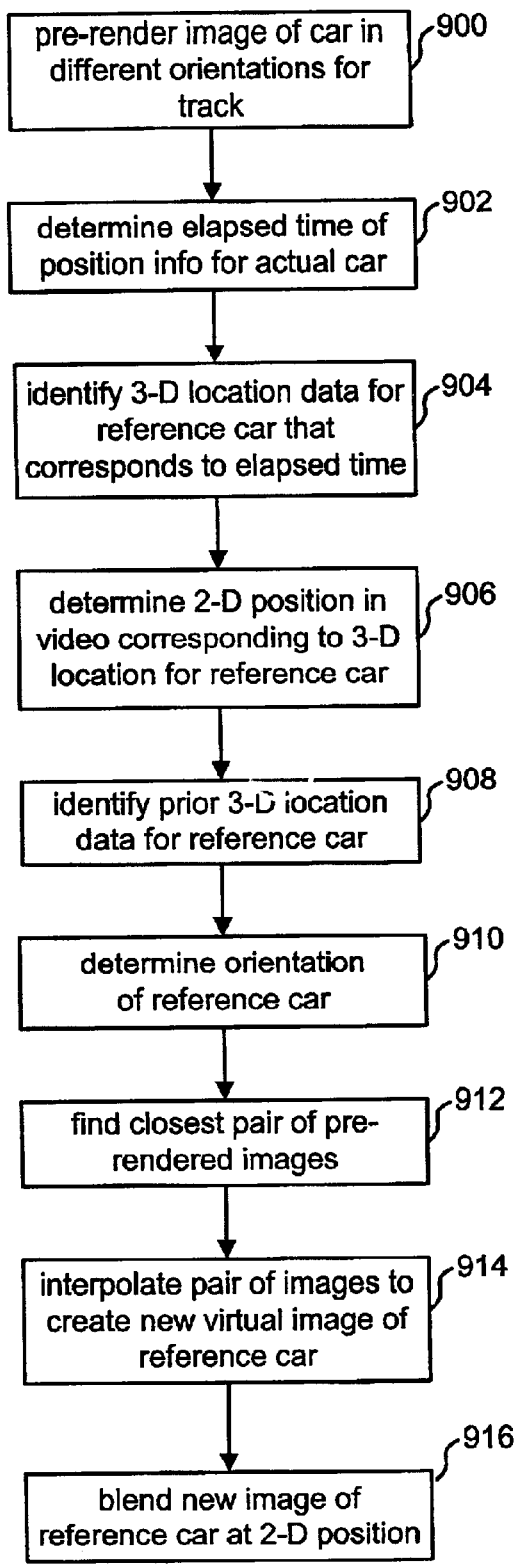
FIG. 26 is a flow chart describing the process of using pre-rendered images to display a phantom object.

FIG. 26 is a flowchart describing a process for providing virtual cars using pre-rendered images. In step 900, pre-rendered images of a car in different orientations are created and stored. Step 900 is most likely done prior to the start of a race; however, it can be done later. Steps 902–916 are likely to be done during or after the race (or other event). At step 902, the system determines the elapsed time for the position information for the actual car being shown in the video. It is assumed that the actual car is in the video and the system is attempting to add a virtual car to the video. The virtual car represents another car that will be referred to as the reference car. The latest position information known for the actual car has a time associated with it. By subtracting the time associated with the car position from the time of the start of the race, an elapsed time can be determined for the actual car. In step 904, the system finds a three dimensional location of the reference car associated with the time determined in step 902. For example, if the elapsed time during a time trial was thirty seconds, the system will look for the three dimensional location of the reference car thirty seconds into the time trial for the reference car. In step 906, that three-dimensional location of the reference car is transformed into a two dimensional position in the video as described above. In step 908, the system determines the three dimensional location data of the reference car just prior to the location data determined in step 904. By knowing two different locations of the car, the orientation of the reference car can be determined. The system then looks for the pre-rendered image having an orientation closest to the orientation of the reference car. Alternatively, the system can look for the closest pair of pre-rendered images and interpolate between the two of them in step 914. In step 916, the new interpolated images (or one of the pre-rendered images without interpolating) is blended with the video. In an alternative embodiment, by identifying the three dimensional location of the virtual car in step 904, the system can determine which section of the track the car was in. Each section of the track can be associated with one of the pre-rendered images and that image can be used to blend with the video in step 916.

Figure 27:
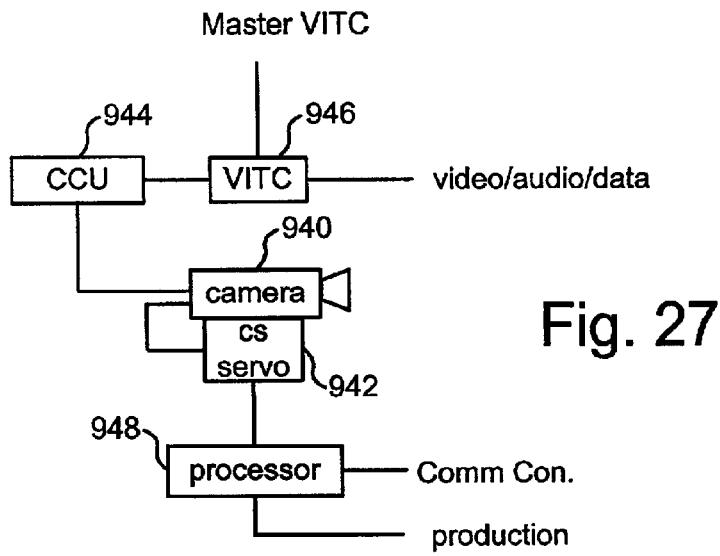
FIG. 27 is a block diagram of the components of an alternative embodiment camera location which implements a crash camera.

One embodiment of the present invention also includes a crash camera, which is a camera that automatically detects that a crash has occurred and automatically points toward the crash. The crash camera enables the television viewer to instantly view a crash scene at a race. FIG. 27 shows one embodiment of the components of the camera location for the crash camera. Camera 940 is a standard broadcast television camera known in the art. Connected to camera 940 are camera sensors and servo motors 942. The camera sensors are similar to the camera sensors described above. Servo motors are motors that move the camera about the pan and tilt axes. The servo motors are controlled by, and in communication with, processor 948. Processor 948 is in communication with communication control computer 520 and the television production equipment that chooses a video source for broadcast. When a crash is detected, processor 548 sends a signal to the production equipment to select the video from camera 940 for broadcast. Processor 948 will receive data about various DAPS units from communication control computer 520. Similar to the camera locations described above, camera 940 is in communication with camera control unit 944, which is connected to VITC 946.

Figure 28:
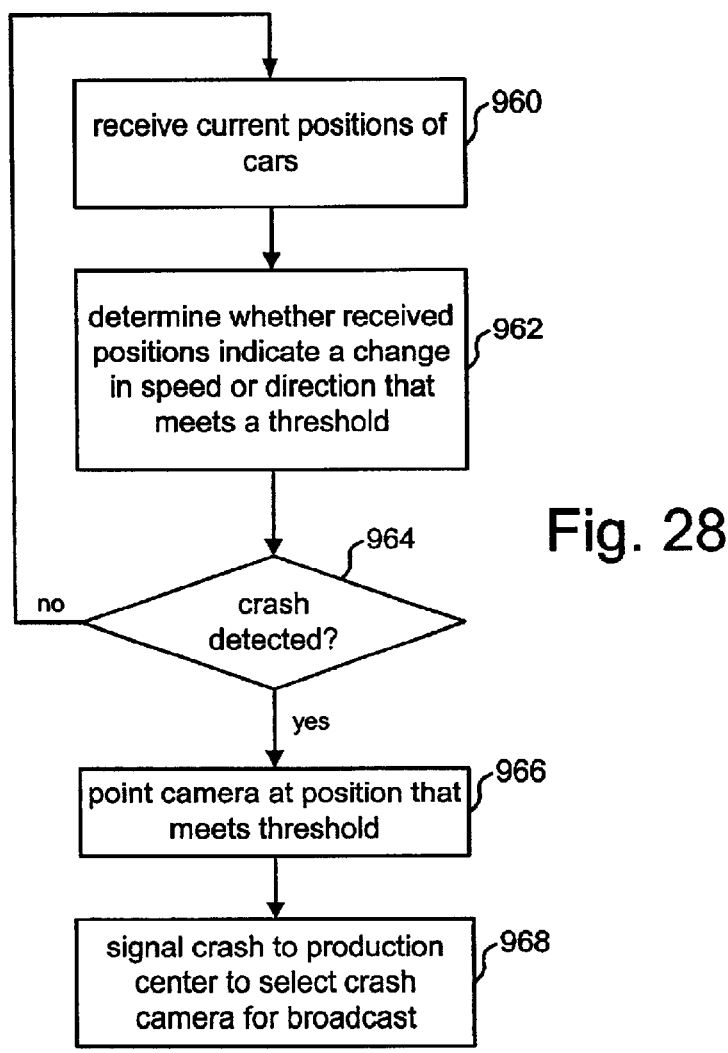
FIG. 28 is a flow chart describing the operation of a crash camera.

FIG. 28 is a flowchart describing the process performed by processor 948. In one embodiment, processor 948 is a personal computer. In step 960, processor 948 receives the current positions of all the cars (or other objects) from communication control computer 520. In step 962, processor 948 determines whether any of the car positions, as compared to previous positions, indicate a change in speed or direction that meets a predefined threshold. Any car that has a sufficient change of direction in a small amount of time or sufficient decrease in speed in a small amount of time is considered to be crashing. If a crash is detected, then the processor 948 sends signals to servo motors 942 to point camera 940 toward the position of the crashing car and a signal is sent from processor 948 to the production equipment to select the video of camera 940 for broadcast. If a crash wasn't detected (see step 964), the method loops back to step 960 and waits for the next set of positions to arrive.

In some embodiments, prior to operating the system for enhancing video described above, the system should be registered. Registration, a technology known by those skilled in the art, is the process of defining how to interpret data from a sensor and/or to ascertain data variables for operation of the system. The camera sensors described above output data, for example, related to position and orientation. Since position and orientation are relative, the system needs a reference from which to determine position or orientation. Thus, in order to be able to use camera sensor data, the system needs to know how to interpret the data to make use of the information. Generally, registration includes pointing the instrumented cameras at known locations and solving for unknown variables used in transformation matrices and other mathematics. More detail of how to register the system can be found in U.S. Pat. Nos. 5,862,517 and 6,229,550, both of which are incorporated herein by reference.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. An apparatus for tracking objects, comprising:

GPS receivers mounted in moving objects;

sensors mounted in said moving objects;

a set of one or more base stations;

transmitters/receivers at said base stations;

transmitters/receivers at said moving objects in communication with said transmitters/receivers at said base station;

a GPS reference station in communication with one of said base stations for providing differential GPS information; and a production center in communication with said base stations.

2. An apparatus according to claim 1, wherein:

said moving objects are race cars.

3. A method for tracking objet is, comprising the steps of:

using GPS to track a set of objects;

sensing data about said set of objects;

communicating said data and GPS positions from said objects to base stations using wireless technology;

determining a set of statistics about said set of objects;

highlighting images of said set of objects in a video; and adding said statistics to said video.

4. One or more processor readable storage devices for storing processor readable code, said processor readable code for programming one or more processors to perform a method for tracking objects, the method comprising the steps of:

using GPS to track a set of objects;

sensing data about said set of objects;

communicating said data and GPS positions from said objects to base stations using wireless technology;

determining a set of statistics about said set of objects;

highlighting images of said set of objects in a video; and adding said statistics to said video.

5. A method for tracking at least one object, comprising the steps of:

receiving data about an object, wherein at least a subset of said data is derived at least in part using GPS;

receiving video including said object;

identifying a difference between a GPS time associated with said GPS and a video time associated with said video; and determining appropriate information for an image in said video, based at least in part on said difference, wherein said appropriate information is derived from at least a portion of said data.

6. A method according to claim 5, wherein said step of identifying includes the steps of:

determining a time associated with said GPS time at a position in a portion of said video; and determining a time associated with said video time at said position in said portion of said video.

7. A method according to claim 6, wherein said step of identifying further includes the step of:

sending a message indicating said time associated with said GPS time and said time associated with said video time.

8. A method according to claim 6, wherein said step of determining said time associated with said GPS time includes the steps of:

recording a series of times associated with said GPS time; and interpolating between a plurality of said times in said series of times to obtain a time corresponding to said time associated with said video time at said position in said portion of said video.

9. A method according to claim 5, wherein said data corresponds to a plurality of objects, said video includes said plurality of objects, and said appropriate information relates to said plurality of objects.

10. A method according to claim 5, wherein said method further includes the steps of:

generating at least one enhancement, wherein said at least one enhancement is derived at least in part from said appropriate information; and enhancing an image in said video using said at least one enhancement.

11. A method according to claim 10, wherein said at least one enhancement is included in a group of enhancements consisting of: speed, acceleration, lap count, lap fraction, race position, time behind leader, virtual loop information, prediction of fuel exhaustion, missing sensor data, a highlight, and a pre-rendered image.

12. A method according to claim 5, wherein said object is participating in a race.

13. A method according to claim 5, wherein said method further includes the step of:

providing error correction information corresponding to an error in satellite timing, wherein said data includes position data derived at least in part using said error correction information.

14. A method according to claim 5, wherein said method further includes the steps of:

tracking said object using GPS, wherein said data includes position data derived at least in part from GPS signals received during said step of tracking;

collecting sensor data about said object, wherein said sensor data is included in said data; and forwarding said data to a production center.

15. A method according to claim 14, wherein said step of forwarding said data to said production center includes the steps of:

forwarding said data to at least one base station; and forwarding said data from said at least one base station to said production center.

16. One or more processor readable storage devices having processor readable code embodied on said processor readable storage devices, said processor readable code for programming one or more processors to perform a method for tracking at least one object, said method comprising the steps of:

receiving data about an object, wherein at least a subset of said data is derived at least in part using GPS;

receiving video including said object;

identifying a difference between a GPS time associated with said GPS and a video time associated with said video; and determining appropriate information for an image in said video, based at least in part on said difference, wherein said appropriate information is derived from at least a portion of said data.

17. One or more processor readable storage devices according to claim 16, wherein said step of identifying includes the steps of:

determining a time associated with said GPS time at a position in a portion of said video; and determining a time associated with said video time at said position in said portion of said video.

18. One or more processor readable storage devices according to claim 17, wherein said step of determining said time associated with said GPS time includes the steps of:

recording a series of times associated with said GPS time; and interpolating between a plurality of said times in said series of times to obtain a time corresponding to said time associated with said video time at said position in said portion of said video.

19. One or more processor readable storage devices according to claim 16, wherein said method further includes the steps of:

generating at least one enhancement wherein said at least one enhancement is derived at least in part from said appropriate information; and enhancing an image in said video using said at least one enhancement.

20. One or more processor readable storage devices according to claim 19, wherein said at least one enhancement is included in a group of enhancements consisting of: speed, acceleration, lap count, lap fraction, race position, time behind leader, virtual loop information, prediction of fuel exhaustion, missing sensor data, a highlight, and a pre-rendered image.

21. An apparatus, comprising:

a communication interface;

one or more storage devices; and one or more processors in communication with said one or more storage devices and said communication interface, said one or more processors programmed to perform a method for tracking at least one object, said method comprising the steps of:

receiving data about an object, wherein at least a subset of said data is derived at least in part using GPS;

receiving video including said object;

identifying a difference between a GPS time associated with said GPS and a video time associated with said video; and determining appropriate information for an image in said video, based at least in part on said difference, wherein said appropriate information is derived from at least a portion of said data.

22. An apparatus according to claim 21, wherein said step of identifying includes the steps of:
   determining a time associated with said GPS time at a position in a portion of said video; and
   determining a time associated with said video time at said position in said portion of said video.

23. An apparatus according to claim 22, wherein said step of determining said time associated with said GPS time includes the steps of:
   recording a series of times associated with said GPS time; and
   interpolating between a plurality of said times in said series of times to obtain a time corresponding to said time associated with said video time at said position in said portion of said video.

24. An apparatus according to claim 21, wherein said method further includes the steps of:
   generating at least one enhancement, wherein said at least one enhancement is derived at least in part from said appropriate information and is included in a group of enhancements consisting of: speed, acceleration, lap count, lap fraction, race position, time behind leader, virtual loop information, prediction of fuel exhaustion, missing sensor data, a highlight, and a pre-rendered image; and
   enhancing an image in said video using said at least one enhancement.

25. An apparatus according to claim 21, wherein said apparatus further includes:
   at least one receiver adapted to receive GPS signals to track said object, wherein said data includes position data derived at least in part from said GPS signals; and
   at least one sensor adapted to collect sensor data about said object, wherein said sensor data is included in said data.

26. An apparatus according to claim 25, wherein said apparatus further includes:
   a base station adapted to receive said position data and said sensor data; and
   a production center adapted to receive said position data and said sensor data from said base station.

27. A method for tracking information about at least one object, comprising the steps of:
   receiving position data about an object, said position data is based on a first GPS sensor;
   receiving sensor data about said object, said sensor data is based on a sensor that is not a GPS sensor;
   receiving video including said object;
   determining at least one statistic related to said object, wherein said at least one statistic is not included in said position data or said sensor data; and
   enhancing said video to display said at least one statistic.

28. A method according to claim 27, wherein said at least one statistic is one of a group of statistics including: speed, acceleration, lap count, lap fraction, race position, time behind leader, virtual loop information, prediction of fuel exhaustion, and missing sensor data.

29. A method according to claim 27, wherein said step of determining at least one statistic includes the step of:
   determining a section of a track in which an object resides.

30. A method according to claim 29, wherein said step of determining at least one statistic includes the step of:
   determining a lap count based at least in part on said section.

31. A method according to claim 29, wherein said section is associated with a first lap fraction and a second section of said track is associated with a second lap fraction and said step of determining at least one statistic includes the step of:
   determining a new lap fraction based at least in part on said first lap fraction and said second lap faction.

32. A method according to claim 29, wherein said section is derived at least in part based on loop data.

33. A method according to claim 27, wherein said step of determining at least one statistic includes the step of:
   determining a prediction of fuel exhaustion at least in part on a proximity of said object to at least one other object.

34. A method according to claim 27, wherein said step of determining at least one statistic includes the steps of:
   determining whether said object crossed a boundary; and
   determining virtual loop information based at least in part on said determination of whether said object crossed said boundary.

35. A method according to claim 27, wherein said position data corresponds to a plurality of objects, said sensor data corresponds to said plurality of objects, said video includes said plurality of objects, and said step of determining includes the step of:
   determining at least one statistics for each object, wherein said at least one statistic for each object is not included in said position data or said sensor data.

36. A method according to claim 27, wherein said method further includes the step of:
   generating at least one non-statistical enhancement for said image in said video; and
   enhancing said image in said video with said at least one non-statistical enhancement.

37. A method according to claim 36, wherein said at least one non-statistical enhancement is included in a group of non-statistical enhancements consisting of: a highlight and a pre-rendered image.

38. A method according to claim 27, wherein said object is an automobile participating in a race.

39. A method according to claim 27, wherein said method further includes the step of:
   providing error correction information corresponding to an error in satellite timing, wherein said position data is derived at least in part using said error correction information.

40. A method according to claim 27, wherein said method further includes the steps of:
   tracking said object using GPS signals, wherein said position data is derived at least in part from said GPS signals received during said step of tracking;
   collecting said sensor data about said object; and
   forwarding said position data and said sensor data to a production center.

41. A method according to claim 27, wherein said method further includes the step of:
   detecting an event related to said object, based at least in part on said position data; and
   positioning a device in response to detecting said event.

42. A method according to claim 41, wherein said event is a crash and said device is a camera.

43. One or more processor readable storage devices having processor readable code embodied on said processor readable storage devices, said processor readable code for programming one or more processors to perform a method comprising the steps of:

receiving position data about an object, said position data is based an a first GPS sensor;

receiving sensor data about said object, said sensor data is based on a sensor that is not a GPS sensor;

receiving video including said object;

determining at least one statistic related to said object, wherein said at least one statistic is not included in said position data or said sensor data; and enhancing said video to display said at least one statistic.

44. One or more processor readable storage devices according to claim 43, wherein said at least one statistic is included in a group of statistics consisting of: speed, acceleration, lap count, lap fraction, race position, time behind leader, virtual loop information, prediction of fuel exhaustion, and missing sensor data.

45. One or more processor readable storage devices according to claim 43, wherein said method further includes the step of:

generating at least one non-statistical enhancement for said image in said video; and enhancing said image in said video with said at least one non-statistical enhancement.

46. An apparatus, comprising:

a communication interface;

one or more storage devices; and one or more processors in communication with said one or more storage devices and said communication interface, said one or more processors perform a method comprising the steps of:

receiving position data about an object, said position data is based on a first GPS sensor, receiving sensor data about said object, said sensor data is based on a sensor that is not a GPS sensor, receiving video including said object, determining at least one statistic related to said object, wherein said at least one statistic is not included in said position data or said sensor data, and enhancing said video to display said at least one statistic.

47. An apparatus according to claim 46, wherein said at least one statistic is included in a group of statistics consisting of: speed, acceleration, lap count, lap fraction, race position, time behind leader, virtual loop information, prediction of fuel exhaustion, and missing sensor data.

48. An apparatus according to claim 46, wherein said method further includes the step of:

generating at least one non-statistical enhancement for said image in said video; and enhancing said image in said video with said at least one non-statistical enhancement.

49. An apparatus according to claim 46, wherein said apparatus further includes:

a base station adapted to receive said position data and said sensor data; and a production center adapted to receive said position data and said sensor data from said base station.

50. A method according to claim 27, wherein:

said at least one statistic is based on at least said position data.

51. A method according to claim 27, wherein:

said at least one statistic is based on at least said position data and said sensor data.

52. A method according to claim 27, wherein:

said step of determining at least one statistic includes determining velocity of said one object.

53. A method according to claim 27, wherein:

said step of determining at least one statistic includes determining acceleration of said one object.

54. A method according to claim 27, wherein:

said step of determining at least one statistic includes determining lap count of an automobile in a race.

55. A method according to claim 27, wherein:

said step of determining at least one statistic includes determining lap count and lap fraction of an automobile in a race.

56. A method according to claim 27, wherein:

said step of determining at least one statistic includes determining a race position of an automobile in a race.

57. A method according to claim 27, wherein:

said step of determining at least one statistic includes determining how far an automobile is behind a leader in a race.

58. A method according to claim 27, wherein:

said step of determining at least one statistic includes determining when an automobile will run out of fuel.

59. One or more processor readable storage devices according to claim 43, wherein:

said at least one statistic is based on at least said position data.

60. One or more processor readable storage devices according to claim 43, wherein:

said at least one statistic is based on at least said position data and said sensor data.

61. An apparatus according to claim 46, wherein:

said at least one statistic is based on at least said position data.

62. An apparatus according to claim 46, wherein:

said at least one statistic is based on at least said position data and said sensor data.

63. An apparatus according to claim 46, wherein:

said determining at least one statistic includes determining velocity of said object.

64. An apparatus according to claim 46, wherein:

said determining at least one statistic includes determining acceleration of said object.

65. An apparatus according to claim 46, wherein:

said determining at least one statistic includes determining lap count of an automobile in a race.

66. An apparatus according to claim 46, wherein:

said determining at least one statistic includes determining lap count and lap fraction of an automobile in a race.

67. An apparatus according to claim 46, wherein:

said determining at least one statistic includes determining position of an automobile in a race.

68. An apparatus according to claim 46, wherein:

said determining at least one statistic includes determining how far an automobile is behind a leader in a race.

69. An apparatus according to claim 46, wherein:

said determining said determining at least one statistic includes determining when an automobile will run out of fuel.

70. A method for tracking a moving object, comprising the steps of:

acquiring GPS data for said moving object;

acquiring error correction information for said GPS data;

determining a location of said moving object based on said GPS data and said error correction information;

receiving video of said moving object;

determining a position of an image of said moving object in said video using said determined location of said moving object; and editing said video based on said determined position of said image of said moving object in said video.

71. A method according to claim 70, wherein:

said steps of acquiring GPS data, determining a location, receiving video, determining a position and editing said video are performed during an event; and said video depicts said event.

72. A method according to claim 70, wherein:

said steps of acquiring UPS data, determining a location, receiving video, determining a position and editing said video are performed in real time during a sporting event; and said video is live video of said sporting event.

73. A method according to claim 70, wherein:

said one moving object is an automobile;

said steps of acquiring GPS data, determining a location, receiving video, determining a position and editing said video are performed during an auto race;

said video depicts said auto race;

said step of acquiring GPS data is performed by a GPS receiver mounted on said automobile.

74. A method according to claim 70, wherein said method further comprises the step of:

receiving data from camera attitude sensors for a camera providing said video, said step of determining a position of an image uses said data from said camera attitude sensors to determined said position of said image.

75. A method according to claim 70, wherein:

said determined location is a three dimensional location in real space; and said determined said position of said image is a two dimensional position in said video.

76. A method according to claim 70, wherein:

error correction information includes differential GPS data.

77. A method according to claim 70, wherein:

error correction information is from a pseudolite.

78. A method according to claim 70, wherein:

said error correction information is used to correct said GPS data by a GPS receiver on said moving object;

said corrected GPS data is sent to a central location; and said step of determining a location is performed at said central location.

79. A method for tracking a moving object, comprising the steps of:

acquiring GPS data for said moving object;

receiving error correction information for said GPS data;

determining a location of said moving object using said GPS data and said error correction information;

receiving video of said moving object;

determining one or more statistics about said moving object based on said determined location of said moving object; and editing said video based on said determined one or more statistics.

80. A method according to claim 79, wherein:

said step of editing includes displaying said one or more statistics in said video.

81. An apparatus for tracking a moving object, comprising:

a GPS receiver mounted on said moving object, said GPS receiver acquires GPS data and receives error correction information for said GPS data, said GPS receiver determines location information of said moving object based on said GPS data and said error correction information;

a first communication device mounted on said moving object and in communication with said GPS receiver to receive said, location information from said GPS receiver a second communication device, said second communication device receives said location information from said first communication device;

one or more processing devices, at least one of said one or more processing devices is in communication with said second communication device and receives said location information from said second communication device, said one or more processing devices determine a position of an image of said moving object in a video using said location information and cause said video to be edited based on said determined position of said image of said moving object in said video.

82. An apparatus according to claim 81, wherein:

said GPS receiver determines said location information during an event that includes said moving object; and said one or more processing devices cause said video to be edited during said event.

83. An apparatus according to claim 81, wherein:

said moving object is an automobile;

said GPS receiver determines said location information in real time during an automobile race;

said video depicts said automobile race; and said one or more processing devices cause said video to be edited during said automobile race.

84. An apparatus according to claim 81, further comprising:

camera attitude sensors for a camera providing said video, said one or more processing devices use data from said camera attitude sensors to determine said position of said image of said moving object in said video.

85. An apparatus according to claim 81, wherein:

error correction information includes differential GPS data.

86. An apparatus according to claim 81, wherein:

error correction information is from a pseudolite.

* * * * *

UNITED STATES PATENT AND TRADEMARK OFFICE
CERTIFICATE OF CORRECTION

PATENT NO. : 6,744,403 B2
DATED : June 1, 2004
INVENTOR(S) : Milnes et al.

It is certified that error appears in the above-identified patent and that said Letters Patent is hereby corrected as shown below:

Column 36,
Line 42, after "tracking" and before "comprising" delete "objet is," and substitute therefore -- objects, --

Column 42,
Line 61, change "said determining said determining" to -- said determining --

Column 43,
Line 16, after "acquiring" and before "data" delete "UPS" and substitute therefore -- GPS --

Signed and Sealed this

Twenty-first Day of December, 2004

JON W. DUDAS
*Director of the United States Patent and Trademark Office*